United States Patent [19]
Day et al.

[11] 3,812,774
[45] May 28, 1974

[54] AUTOMATIC POPCORN POPPING MACHINE

[75] Inventors: Alan M. Day, Oakland; Gordon D. Browning, Castro Valley, both of Calif.

[73] Assignee: Compupop, Inc., San Leandro, Calif.

[22] Filed: Aug. 25, 1972

[21] Appl. No.: 283,932

Related U.S. Application Data

[62] Division of Ser. No. 875,759, Nov. 12, 1969, Pat. No. 3,697,289.

[52] U.S. Cl................ 99/323.8, 99/323.9, 222/192
[51] Int. Cl.............................................. A23l 1/18
[58] Field of Search............ 99/323.5, 323.7, 323.8, 99/323.9, 232.11; 222/192, 251

[56] References Cited
UNITED STATES PATENTS

| | | | |
|---|---|---|---|
| 1,477,704 | 12/1923 | Holcomb | 99/323.9 |
| 1,545,357 | 7/1925 | Schwimmer | 99/323.8 |
| 2,254,271 | 9/1941 | Cretors | 99/323.9 |
| 2,972,292 | 2/1961 | Waas | 99/323.8 |
| 3,254,800 | 6/1966 | Baunach | 99/323.8 |

*Primary Examiner*—Robert W. Jenkins
*Attorney, Agent, or Firm*—Flehr Hohbach Test Albritton & Herbert

[57] ABSTRACT

Method and apparatus for automatically popping corn in heated seasoning oil. Raw corn is fed by an air conveyor to a hopper above the popping pot, and an air current is used for injecting a charge of corn and salt into the pot. Seasoning oil is metered into the pot by an adjustable valve providing precise volume measurement. The oil supply is delivered to the metering valve by a pump in an oil vat and with a heater adapted to melt the seasoning adjacent the pump intake, and melt along a telescoping feed tube to prevent pump cavitation. Electronic sensors in the corn and oil supply signal a control circuit for supplies refill as required. A rotary valve disc in the pot is mechanically interlocked with switching circuits of the control system to correlate corn and salt input into the pot, cooking, steam discharge to a condenser, and air discharge of popped corn to a display area. A deflector plate in the air stream into the pot directs the air into a path for optimum corn evacuation through a discharge tube opening downwardly inside the pot. The pot remains closed throughout a series of popping cycles for cleanliness, convenience, and safety. An agitator in the pot is formed in a configuration drawing the popped corn radially inwardly for evacuation into the discharge opening. A self-cleaning condenser is adapted to condense steam and waste oil exiting from the pot and a steam condensate trap is provided in a modified form. A venturi formed at the condenser outlet and communicating with a blower is adapted to create a vacuum in the pot during the popping cycle to prevent effluent from discharging into the display case and to draw it into the condenser. A spring-load agitator drive shaft releasably interlocks with a corresponding socket in the agitator base affording easy opening and closing of the pot by pivotal movement of the agitator and hot plate. "Old maids" in the discharge of popped corn from the pot are trapped and separated therefrom for removal through a chute in one form, or through a screen in the bottom of the display case in another form.

37 Claims, 22 Drawing Figures

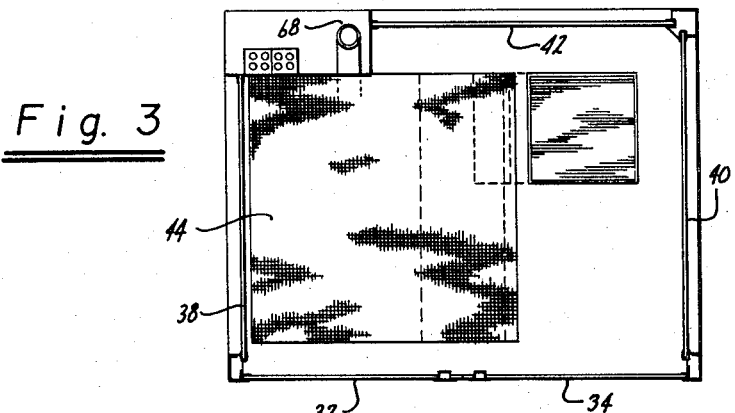
Fig. 3
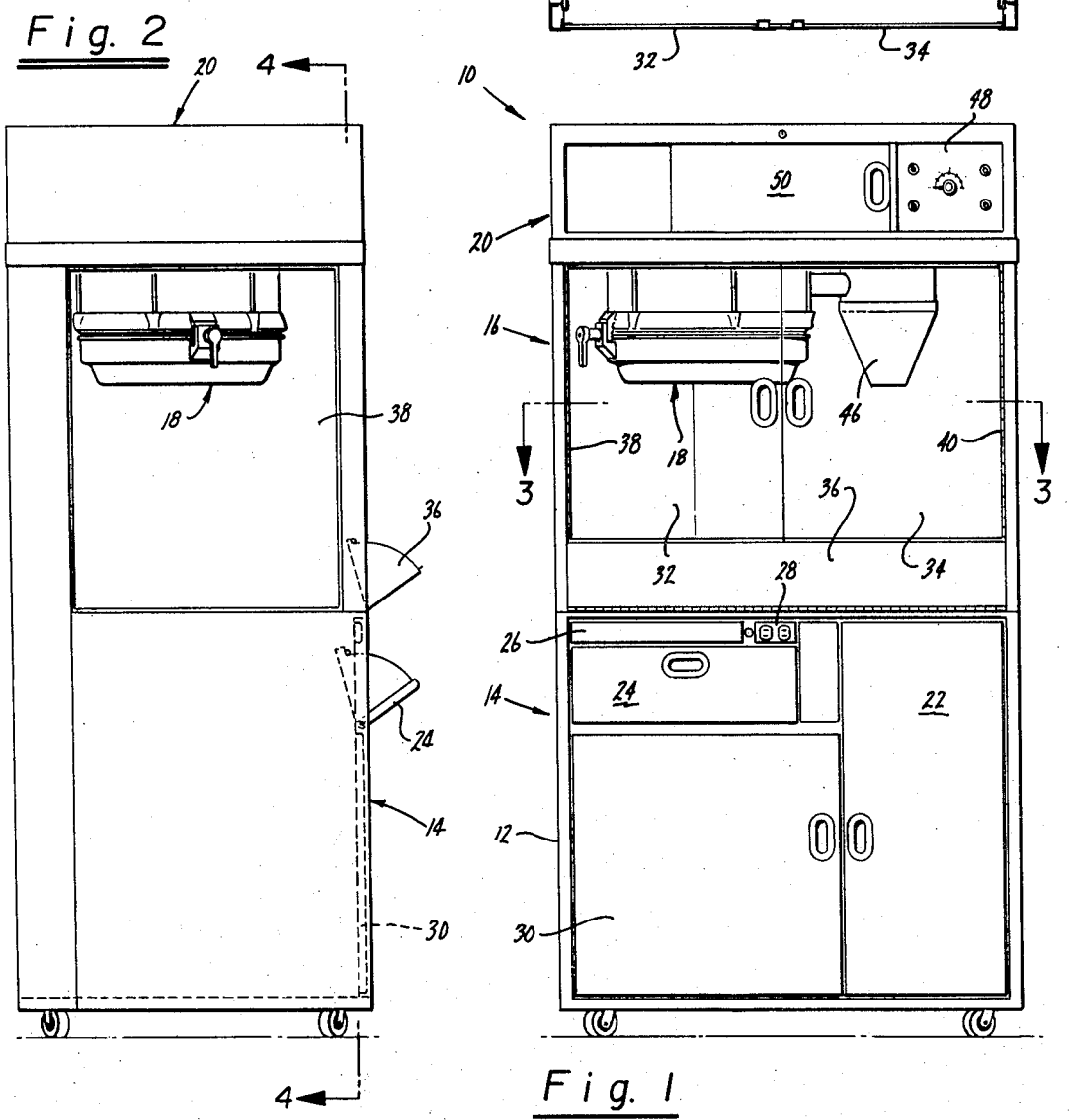
Fig. 2
Fig. 1

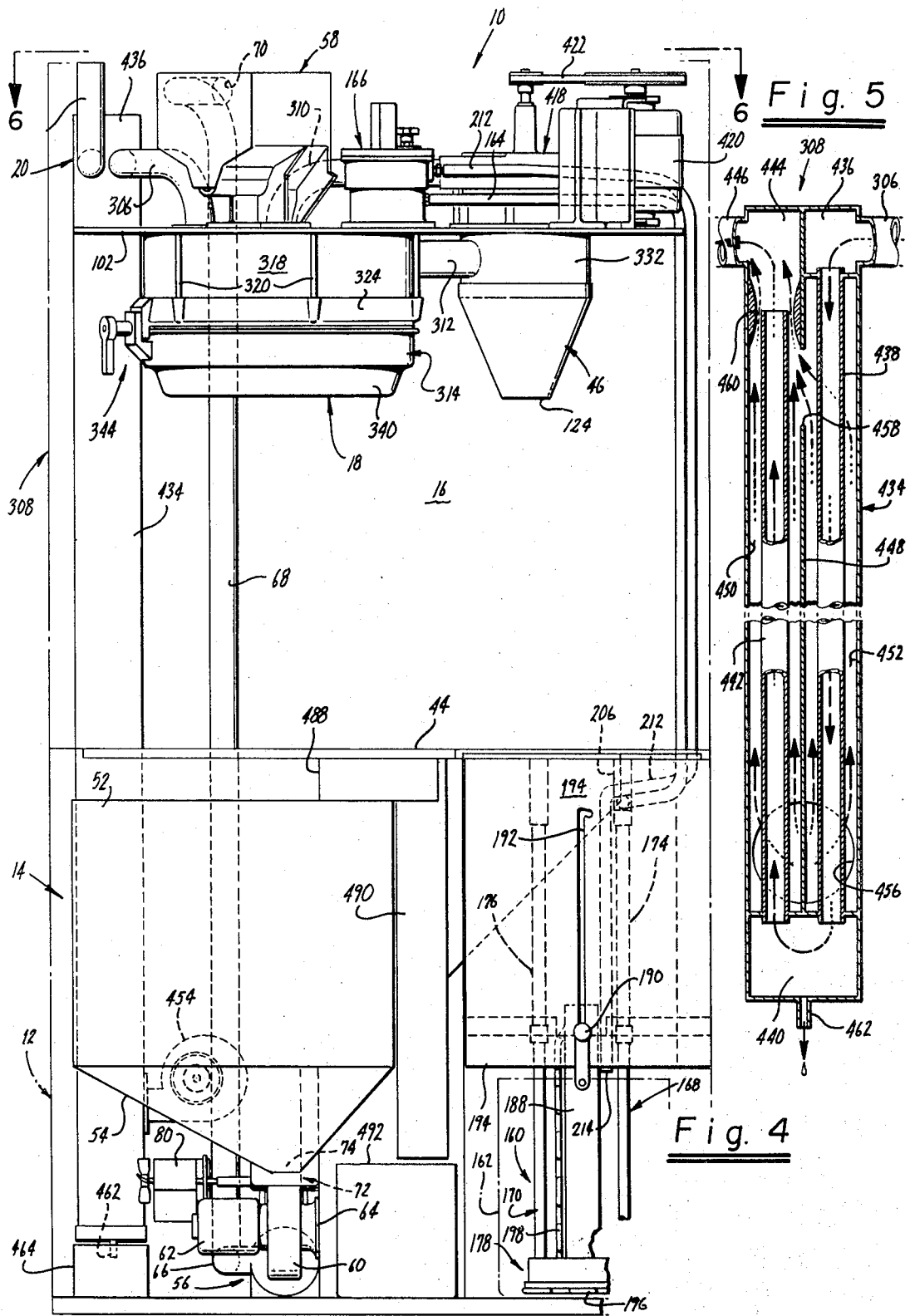

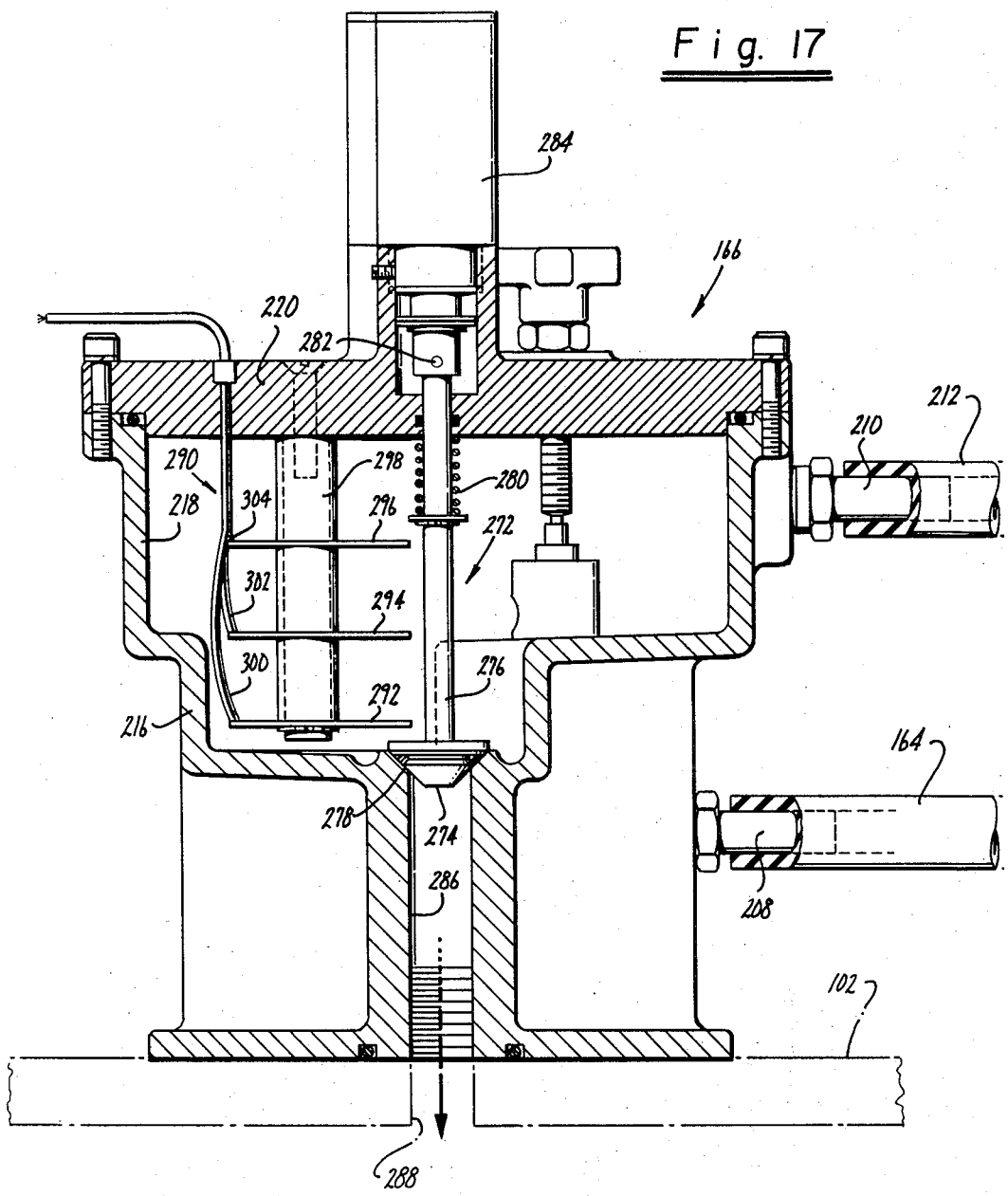

AUTOMATIC POPCORN POPPING MACHINE

CROSS-REFERENCE TO RELATED APPLICATION

This application is a division of Ser. No. 875,759 filed Nov. 12, 1969, now U.S. Pat. No. 3,697,289.

BACKGROUND AND OBJECTS OF THE INVENTION

This invention relates to automatic popcorn popping machines.

Automatic popcorn popping machines have been provided for use in theatres, clubs, amusement parks, and other establishments to supply the public's demand for popcorn. These machines, however, have many disadvantages and limitations. A majority of the conventional poppers must employ hot air popping rather than the more desirable oil popping. Operation of the prior art popping machines is not entirely automatic in that many of the steps must be performed manually, requiring the presence of an operator. Thus, certain of the machines require manual control of filling the popper with corn, seasoning oil and salt. In these machines the pot must be opened for each pop, and this introduces the possibility of contaminants entering the pot and mixing with the popped corn, as well as the possibility of injury to the operator. Popping machines of the open-pot type also quickly lead to fouling and unsightliness of the display case after only a few pops resulting from condensed steam and waste oil.

Previous popping machines have not been entirely successful in providing a salable product having the desirable qualities of uniform flavor, tenderness and appearance. These have varied depending upon factors such as operator judgment or machine limitations in measuring the amount of raw products in the supply hoppers, time length for each cycle, the temperature in the pot during a pop, control of steam and waste oil effluent from the popper, and separation of "old maids" from the popped corn. In these poppers the operation has not been failsafe such that the cycle is interrupted should any of the supplies be insufficient for a popping cycle. Also, if the operation stops during any cycle, there is no assurance the machine will continue with the correct cycle sequence upon restart. Previously, salt injection into the popper has been a problem, and conventional machines have not successfully metered the precise amount of salt into the popper for uniform results.

Conventional popping machines also do not lend themselves to a continued series of popping cycles untended by an operator, and they have no provision for selectively controlling the rate of popping and the total number of pops in a completely automatic process.

Accordingly, it is the object of this invention to provide a popcorn popping machine which is fully automatic in operation and affords selective adjustment of the popping variables to produce a uniform popcorn product of the desired flavor and appearance.

Another object is to provide a fully automatic machine for popping corn in heated seasoning oil.

Another object is to provide a popcorn popping machine having a closed pot throughout a series of popping cycles eliminating the possibility of contamination of a pop, injury to the operator, and effluent discharge into the display case.

Another object is to provide a popcorn popping machine having electronic sensing of corn and salt supplies, and with electronic controls for precise timing and temperature control for the various cycles to produce a uniformly popped corn product of superior quality.

Another object is to provide an automatic corn popper of the type described providing air feeding of raw corn from a lower supply bin to an upper hopper positioned for feeding a precise charge into the popping pot.

Another object is a corn popping machine with air drying of the corn hopper and salt supply while injecting a charge into the popper.

Another object is a corn popper providing a vacuum in a pot during the popping cycle to draw steam and vaporized waste oil into a condenser while preventing the same from contaminating the display case and popcorn product.

Another object is to provide a self-cleaning condenser to condense steam and waste seasoning oil from the popper and prevent the same from escaping from the machine or surrounding room.

Another object is a popping machine providing air evacuation of the popped corn product from the popper into the display case.

Another object is a popping machine providing air evacuation of the popped corn with a tram for removing "old maids" from the product and directing them into a chute for subsequent removal.

Another object is a popping machine having a rotary valve disc above the popper to gate material supplies into the popper, control effluent waste removal to a condenser, and evacuate the corn product into the display case according to a predetermined program which maintains a program memory in the event of shutdown or power loss.

Another object is a popping machine having a seasoning pump progressively melting through a seasoning supply source providing a relatively short seasoning melt time during start-up by reducing the amount required to be melted and pumped to the oil metering device for an initial charge.

Another object is a popping machine having an agitator blade in the pot with a configuration drawing the popped corn inwardly toward the center for efficient air evacuation.

Another object is a popping machine having a closed pot with the drive for the agitator spring-loaded from above and interfitting with the agitator blade in a connection affording simplified opening and closing of the lower hotplate and blade away from the upper portion of the pot and drive for cleaning purposes.

Another object is a popping machine having a rotary valve disc positioned above the pot to control machine processes, and with control switches interlocked with the valve disc to generate control signals in a manner preventing any process from functioning out of order.

Another object is a popper machine having a seasoning oil metering device providing fail-safe operation and with a precise charge of oil measured by selectively adjusting the level for oil discharge from the metering reservoir whereby the oil is pumped into the reservoir above a predetermined level, and drained through the adjustable opening until the precise oil quantity remains in the reservoir for injection into the pot.

Another object is a popping machine having a seasoning oil metering device which feeds an oil charge into the popper only when a sufficient amount of oil for the charge is available for the desired pop.

These and other objects and advantages of the invention will become apparent to those skilled in the art when the following specification is read in conjunction with the accompanying drawings.

SUMMARY OF THE INVENTION

The invention provides a popping machine and method of operation with fully automatic functions controlled in accordance with a predetermined program providing an optimum popcorn product of uniform flavor, tenderness, and appearance. The corn is popped in hot oil enabling the use of a lower popping temperature. A closed popping pot reduces the possibility of contaminants mixing with the product and affords removal of objectionable steam and waste oil effluent. The material supplies corn and salt are precisely metered in a predetermined quantity for each popping cycle, and are conveyed into the pot by an air current removing objectionable moisture therefrom and providing a positive hopper air pressure at all times. The raw corn is fed from a large bin at the base of the machine upwardly to a supply hopper above the pot by an air conveyor. Seasoning oil contained in a supply at the base of the machine is delivered upwardly to a metering reservoir above the pot by a pump in the oil supply through a telescoping supply tube and support. Heating means are provided to melt that portion of the solidified oil adjacent the pump inlet and telescoping tube for rapid start-up. As the oil is consumed, the pump melts additional oil and moves downwardly with the level of the solidified oil. An oil metering device is provided measuring the precise quantity of oil required for each pop by filling up above a predetermined level in the reservoir, drawing down the oil to a level which is vertically adjustable, and then injecting the charge of remaining oil into the pot. The oil level in the reservoir is electronically sensed to signal the control circuit for continued cycling, or oil re-supply, as required. A rotary valve disc is indexed in accordance with a predetermined program and exposes a series of inlets and outlets including the inlets for air, corn and salt supplies, outlet to the condenser, and product outlet for communication between the pot interior and display case. A deflector plate is disposed below the air inlet for directing the air current into a path around the inner periphery of the pot for carrying the popped corn upwardly to a discharge tube for delivery to the display case. In a modified form the unpopped corn or "old maids" are removed from the popped corn by a trap and delivered through a discharge chute for subsequent removal. During a popping cycle the steam and vaporized oil are removed from the pot by a vacuum created by a venturi in a self-cleaning condenser. In another modified form a major portion of the steam is condensed within an exit conduit having a dome disposed above a gutter receiving the condensed water and preventing the same from draining back into the pot. An agitator blade in the pot has a configuration with its leading edge defining a forward rake to sweep the popped corn radially inward for evacuation into the discharge opening. The drive for the agitator includes a spring-biased driving shaft mounted from above and interfitting with a socket in the agitator base permitting easy opening and closing of the agitator and hotplate for cleaning purposes. An electronic control circuit is provided to correlate the various machine processes, provide automatic warning of insufficient material supplies, provide a visual indication of machine cycling, provide selective variation of material supplies and popping times for maximum popcorn volume, tenderness, flavor and appearance, provide either continual popping or a selected number of pops at any desired rate, and automatically count the number of pops for supply and usage control.

DESCRIPTION OF THE DRAWINGS

FIG. 1 is a front elevation view of an automatic popcorn popping machine embodying features of the invention.

FIG. 2 is a side elevation view of the machine of FIG. 1.

FIG. 3 is a sectional plan view taken along the line 3—3 of FIG. 1.

FIG. 4 is a front elevation view taken along the line 4—4 of FIG. 2.

FIG. 5 is an elevation cross-sectional schematic view of a component condenser element in the invention.

FIG. 17 is an elevation sectional view of the oil metering assembly taken along the line 17—17 of FIG. 6.

DESCRIPTION OF THE PREFERRED EMBODIMENTS

Figure 6:
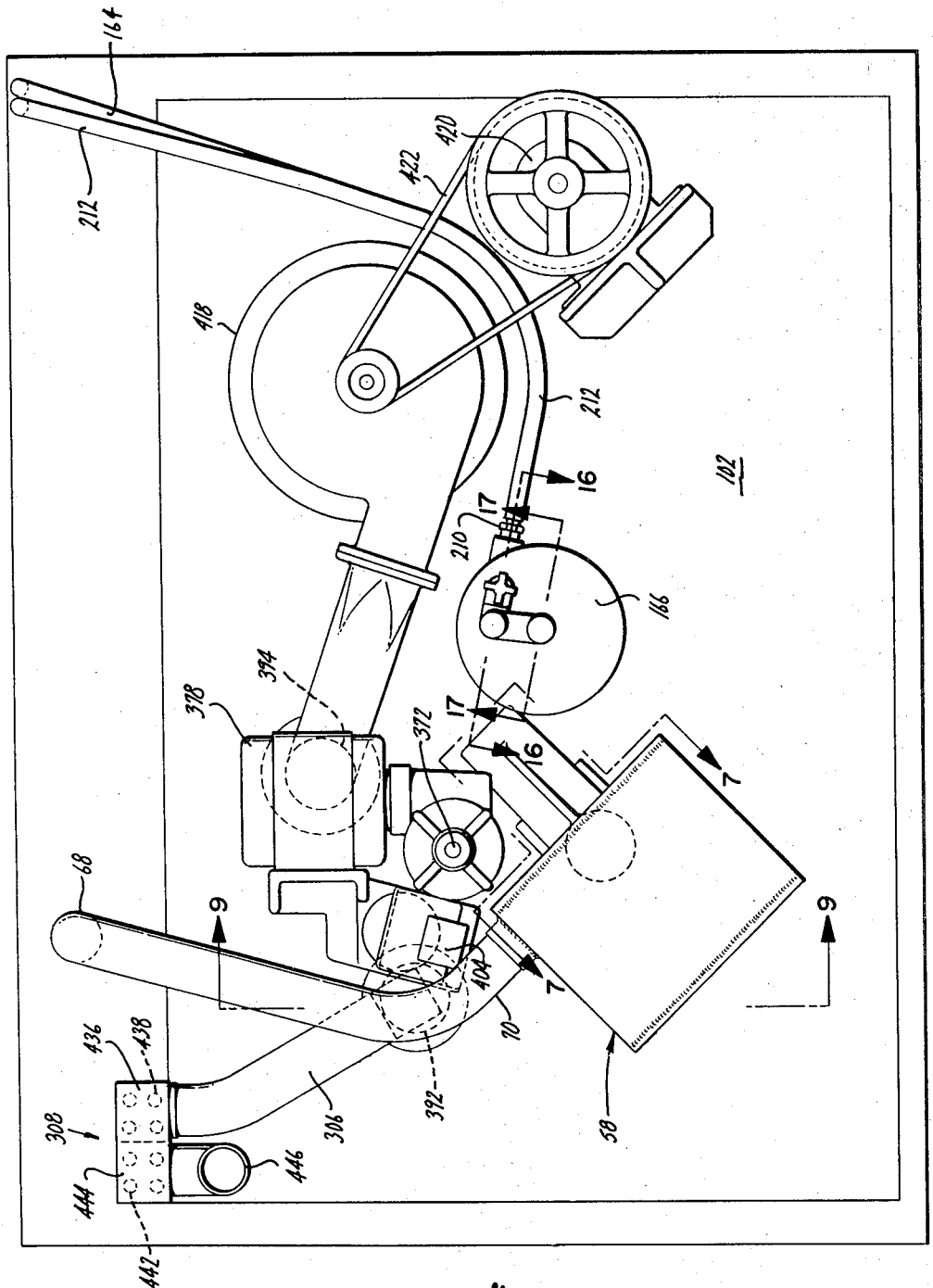
FIG. 6 is a top plan sectional view taken along the line 6—6 of FIG. 4.

Referring to the drawings, and particularly to FIGS. 1-3, a preferred form of the automatic popcorn machine is illustrated generally at 10.

Popcorn machine 10 comprises a main frame or supporting structure 12 including a lower supplies section 14, a central display case 16, a popping pot assembly 18 depending into the case, and an upper section 20 containing the systems control circuits, operating mechanisms, and metering devices with associated control knobs and indicator lights.

Lower supplies section 14 is provided at its front with various access doors for resupplying the corn and oil supplies and removal of waste products. Access door 22 opens outward from the frame for access to a seasoning oil container insertable into the bottom of frame 12. Access door 24 opens forwardly for convenience in filling a raw popcorn bin within the frame. Lockable door or drawer 26 may be provided for safeguarding cash. An electrical outlet 28 may be provided for powering accessory equipment. An access door 30 is provided and hinges for outward swinging movement to provide access to the mechanical equipment located in the bottom of the frame and for removal of the "old maids" bin and condensate pan.

Display case 16 includes a front wall defined by a pair of outwardly pivoting transparent doors 32, 34, providing access to the interior of the case for bagging popcorn and cleaning purposes. A forward pivoting door 36 is also provided below the transparent doors for removing popcorn. The display case sides 38, 40 and back 42 are preferably transparent for customer attention and product appeal. Referring to FIG. 3, a suitable screen 44 is provided in the bottom of the display case to pass the fines and "old maids" downwardly into a chute leading into a bin for subsequent removal. Popping pot 18, described in greater detail hereinafter, delivers the popped corn into the display case through cone 46 in an attention getting shower onto the bottom of the case.

Upper portion 20 includes on its front face a control panel 48 including the selector knobs and indicator lights to be presently described. A lockable control cover panel 50 is slideable along the front face of a panel 48 and, when locked in position, prevents unauthorized usage of the machine.

Raw Corn Storage and Conveyor

Figure 12:
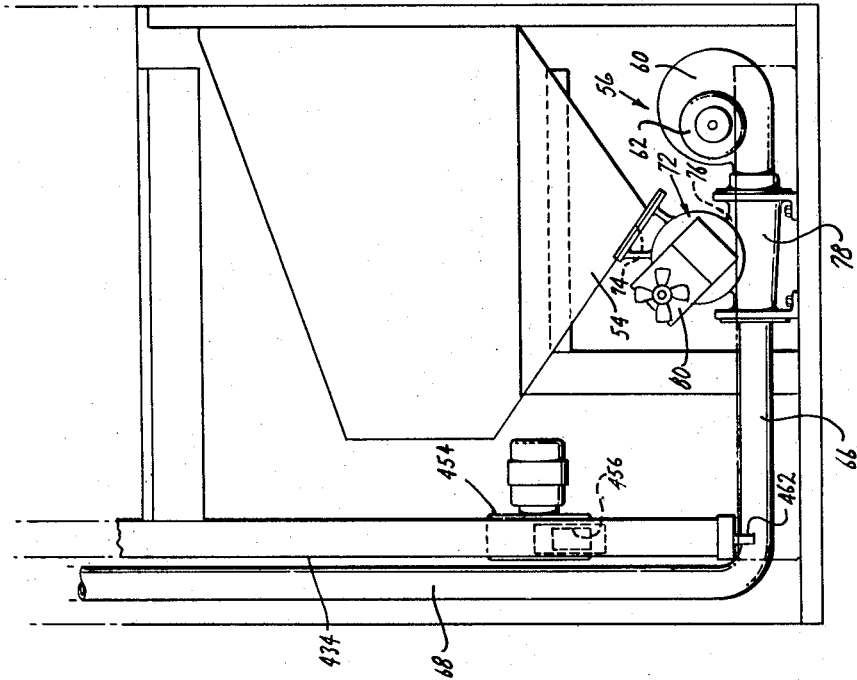
FIG. 12 is a side elevation view, with portions removed for clarity, of the popping machine showing features of the corn supply and air conveyor.

Referring to the cross-sectional elevation view of FIG. 4, elements of the raw corn storage and conveyor system are illustrated in greater detail. A large corn supply bin 52, capable of storing up to 100 lbs. of corn, is mounted in a lower portion of frame 12. The bin is provided with a trough-shaped bottom 54 directing the raw corn downwardly into air-conveyor device 56 which automatically delivers a supply of corn, as required, upwardly into corn hopper 58 disposed in upper section 20 above pot 18. Air conveyor 56 includes a suitable blower 60 driven by a preferred electric motor 62. The blower draws inlet air through opening 64 and directs it through transverse conduit 66 upwardly through vertical conduit 68 passing along the rear wall of the display case, as best illustrated in FIG. 12. Corn from bin 54 is delivered intermittently through the air stream from the blower by metering device 72 operated by a signal from the control circuit indicating that a resupply of hopper 58 is required. Metering device 72 may be any suitable valving arrangement, and preferably comprises a conventional scroll or auger conveyor horizontally axised with an inlet opening at 74 communicating with bin 54 and with an outlet at 76 communicating with throat section 78 comprising a section of the air stream conduit. Metering motor 80 driving the auger is actuated responsive to a corn resupply signal until terminated responsive to corn level sensors in hooper 58 indicating that a sufficient quantity of corn has been supplied for an additional charge of corn into the pot.

The upper section of vertical conduit 68 passing through display case 16 is preferably formed of a transparent material such as plastic affording an attractive display of corn delivery for public viewing.

With the corn supply in bin 52 at the lowermost portion of the machine, reloading through access door 24 is more easily and conveniently accomplished as opposed to a corn supply location above the popper. At the same time, the lower corn storage location is cooler and thus does not dry the corn as fast, as opposed to a location closer to the warmer portion of the machine near the popper. The air feed is a simple and inexpensive method of deliverying a relatively small amount of corn intermittently on a demand basis. Neither the auger metering device nor the air conveyor itself are injurious or damaging to the corn kernels.

Corn and Salt Hopper 58

Figures 7, 8:
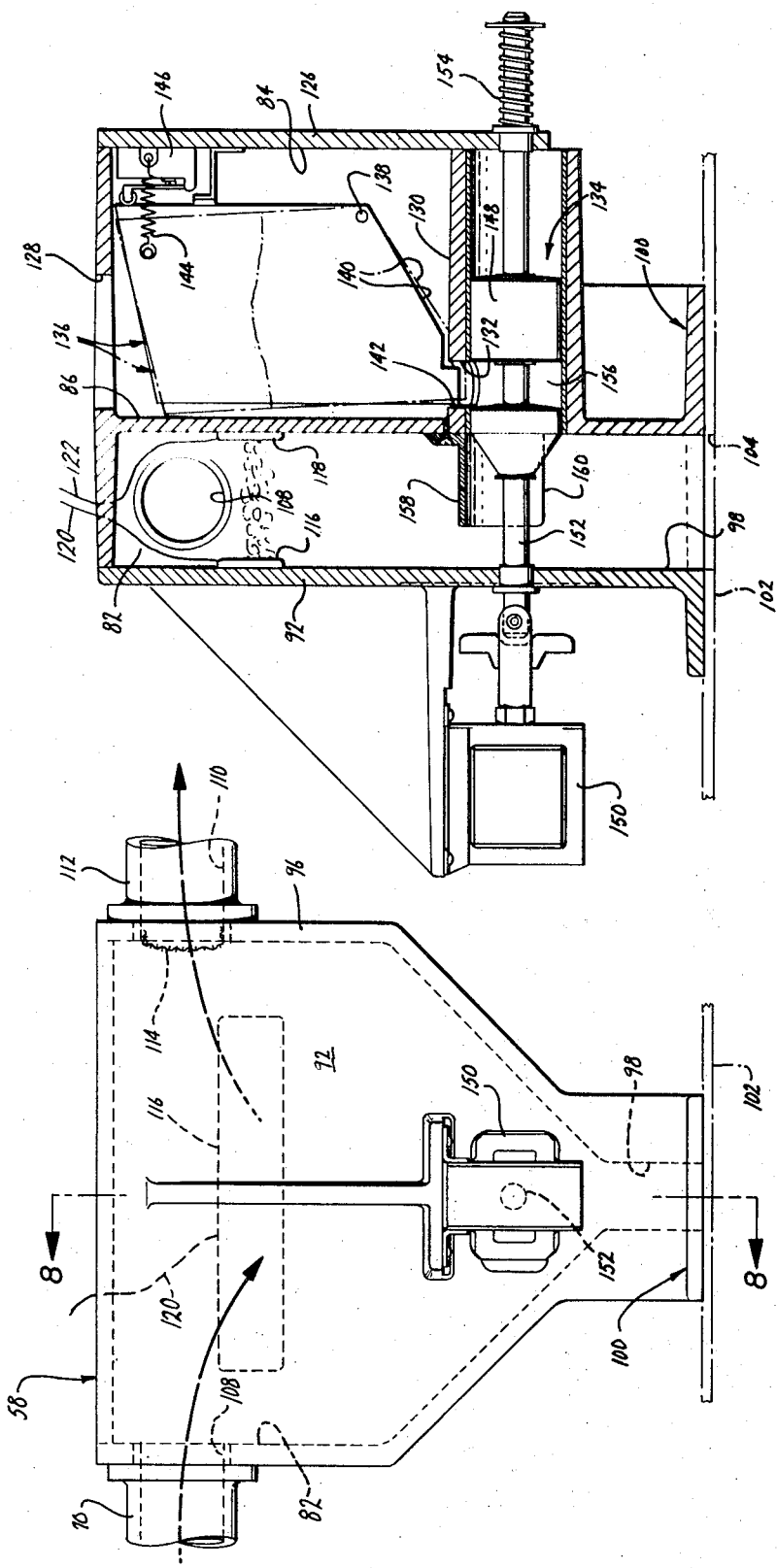
FIG. 7 is a fragmentary section view of the cornsalt hopper taken along the line 7—7 of FIG. 6.
FIG. 8 is a sectional view of the hopper taken along the line 8—8 of FIG. 7.

Referring to FIGS. 7 and 8 hopper 58 is shown in greater detail. In the preferred form, the hopper is divided into a corn reservoir 82 and salt chamber 84 by means of center partition 86, although the two supply reservoirs could be separated into individual chambers. The corn and salt supplies are in juxtaposition to simplify and improve injection of the charges into the popper, as described hereafter.

Corn reservoir 82 is closed at the top by upper wall 90, at the sides by partition 86 and side wall 92, and at the ends by end walls 94, 96 converging together below to define a narrowed throat section 98. The hopper is mounted by means of base 100 on top of a support plate 102 separating display case 16 from upper section 20. Throat section 98 of the hopper is in vertical registry with an opening 104 provided in plate 102, and this opening in turn communicates with popping pot 18 upon a fill cycle of the rotary valve apparatus 106 of FIG. 18.

An inlet opening 108 is provided in end wall 94 of the corn reservoir communicating with conduit 70 of air conveyor 56. An outlet 110 is provided in the other end wall 96 and communicates with an air outlet conduit 112. A screen 114 is provided over opening 110 to retain the corn within the reservoir. During operation of the air conveyor, corn entering the reservoir through opening 108 refills the reservoir while the conveying air exits through opening 110.

The level of corn in the reservoir is sensed by a pair of capacitor plates 116, 118 mounted at the desired level within the reservoir to respective side wall 92 and partition 86. As the corn fills within the reservoir and occupies the space between the capacitor plates, the capacitance across the plates changes. This actuates the control circuit through leads 120, 122 for terminating operation of the corn meter motor, and energizes the corn indicator light for continuation of the cycling operation in a manner described hereinafter.

Figure 10:
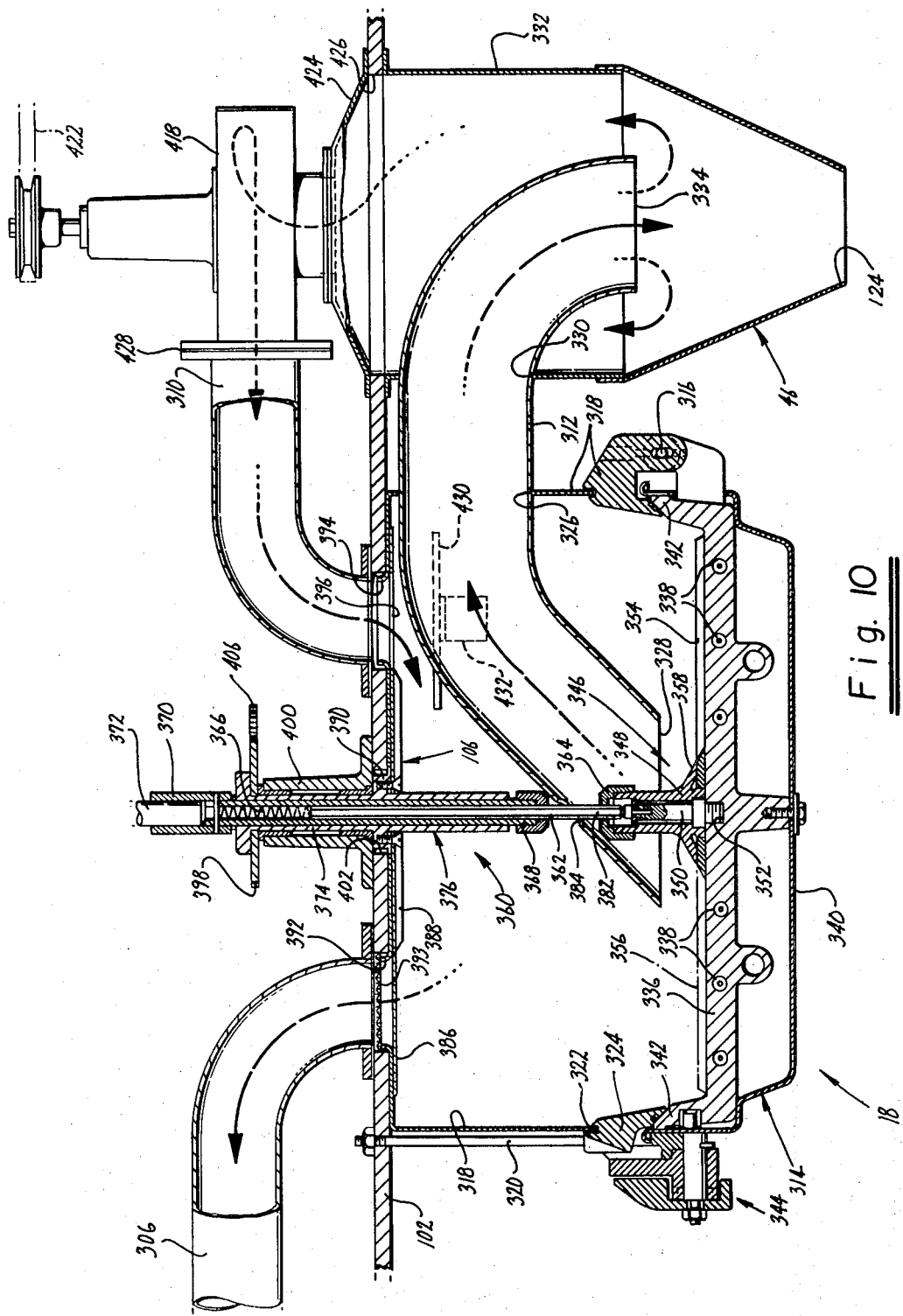
FIG. 10 is a cross-sectional elevation view of the popping pot and associated elements of the invention.

During injection of the corn charge into the pot, the valve hole or opening 396 of valving apparatus 106 moves into alignment with hopper throat section 98. The corn is swept into the pot from the hopper by both the action of gravity and a stream of air from air conveyor outlet 70 moving down through the throat section 98 into the pot and exiting through the lower opening 124 of cone 46, as best seen in FIG. 10. The continued air pressure in the hopper from air conveyor 56 insures an air flow into the pot preventing any effluent from entering and fouling the hopper. This continues air flow, although principally effective during filling, provides insurance of a positive pressure in the hopper to prevent effluent leakage at all times.

After the corn has been injected, a charge of salt is then introduced into the pot from salt chamber 84. The salt chamber is closed at its sides by partition 86 and side wall 126, and at its end walls 94 and 96 coextensive with the corn reservoir. The top of chamber 84 is provided with a fill hole 128, and the bottom is confined by housing 130 provided wth an opening 132 communicating with a charging valve 134. A salt bin 136 is pivotally mounted at 138 within chamber 84. Bottom wall 140 of the bin slopes downwardly from the pivot point to a relatively small spout or opening 142. The spout is adapted to move into opening 132 and act as a funnel for filling the charging valve 134. Bin 136 is yieldably biased by suitable means such as spring 144 upwardly within the salt chamber, or clockwise as viewed in FIG. 8. A normally closed switch 146 is mounted on chamber wall 126 an is adapted for contact with salt bin 136 for opening when the bin is in its upper position, and for closing when the bin pivots away.

Salt bin 136 preferably has a capacity on the order of 6½ pounds, adequate for from 75 to 100 pops. With the bin filled with salt, it will pivot counter-clockwise by gravity against the force of spring 144 to close switch 146, which in turn signals the control circuit to light the salt indicator light and condition the circuit for continued cycling. As salt is gradually used up so that an insufficient supply remains in the bin for continued popping, spring 144 will overcome the weight of the bin, pivot it clockwise, and thereby open switch 146 to signal the control circuit to stop the fill cycle and turn off the salt lights so that the salt supply must be replenished.

Charging valve 134 comprises a spool valve 148 axially slidable in housing 130 underneath salt chamber opening 132 by the action of solenoid 150 operatively connected with valve stem 152. A return spring 154 is provided at the opposite end of valve stem 152 for returning valve 134 to the position illustrated for receiving a supply of salt from bin 136. In this position, salt drains from spout 142 through opening chamber opening 132, and into cavity 156 formed between the lands of the spool valve. The volume of this cavity is selected to provide sufficient salt for one pop. The salt draining through spout 142 will automatically stop after the cavity is filled to a level just above the lower edge of the spout.

During a salt charging or filling operation after the charge of corn has been injected into the pot, solenoid 150 is actuated by the control circuit to move spool valve 148 to the left so that the salt in cavity 156 is swept into the pot by gravity and the air current previously described. A shield 158 comprises a section of a cylinder secured at one side to partition 86, and is adapted to slideably receive spool valve 148. The lower section of shield 158 is cut away at 160 to allow the salt to drop through by gravity and be swept along by the air stream. This air injection of the salt into the pot serves to dry the salt and prevent fouling or sticking of the component elements, and at the same time insures that all of the salt in each charge completely enters the pot for popping.

Seasoning Oil Pump System

Figure 13:
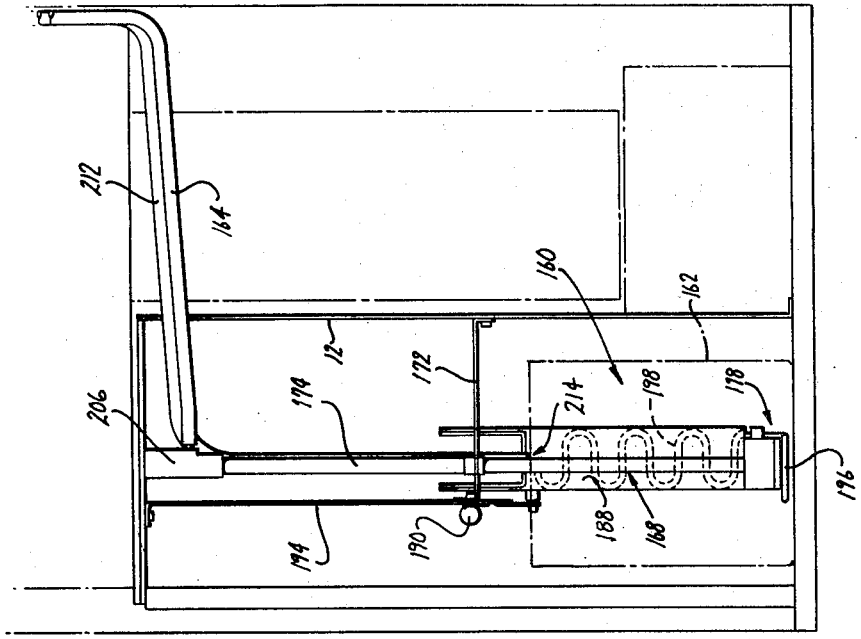
FIG. 13 is a partial front elevational view, with portions removed for clarity, illustrating the seasoning oil supply and pump with telescoping support and feed tube and heater elements.

The seasoning oil pump system includes a pump assembly 160 disposed within a seasoning oil bucket or vessel 162 positioned at the bottom of frame 12 for easy replacement, as illustrated in FIGS. 4 and 13. The pump assembly is adapted to intermittently pump a supply of oil on a demand basis from bucket 162 upwardly through feed line 164 into oil reservoir 166 mounted above supported plate 102 and positioned for injecting an oil charge into pot 18, as explained hereinafter. The preferred seasoning oil would be coconut oil, although other conventional popping oils may be used with the invention.

The seasoning oil useful with the invention solidifies at room temperature. The invention provides a means for melting a small quantity of the oil required for a number of initial popping cycles without the necessity of melting the entire contents of the oil bucket. This provides a more rapid start-up of the machine, as well as requiring less power.

Figure 14:
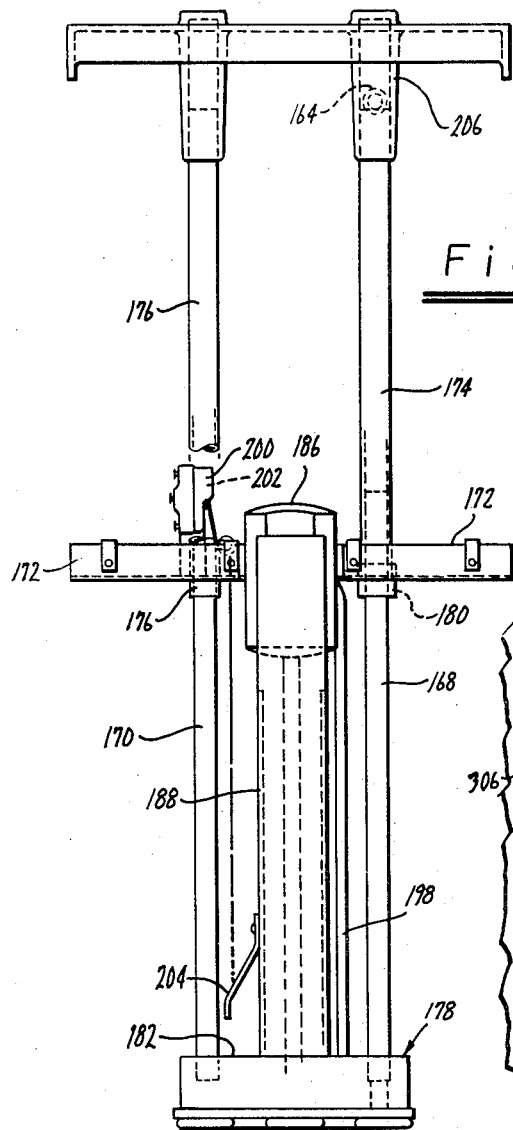
FIG. 14 is an elevation view to an enlarged scale of the oil pump and heater elements of FIG. 13.

Pump assembly 160 is adapted to move downwardly on the surface of the solidified oil while guided by a telescoping feed line 168 and telescoping support 170, as best seen in FIG. 14. A bracket 172 mounted on frame 12 supports the outer telescoping member 174 of feed line 168, and outer telescoping member 176 of support 170. Feed line 168 is a rigid conduit secured at its lower end to pump unit 178, and slideably received at its upper end within outer telescoping member 174. Similarly, telescoping support 170 is mounted at its lower end to the pump unit and is slideably received at its upper end with telescoping member 176. An O-ring seal 180 is mounted within the lower inner periphery of member 174 to provide a fluid-tight seal with feed line 168. The telescoping feed tube eliminates the requirement for flexible hosing which otherwise could kink and interfere with pump operation.

Figure 15:
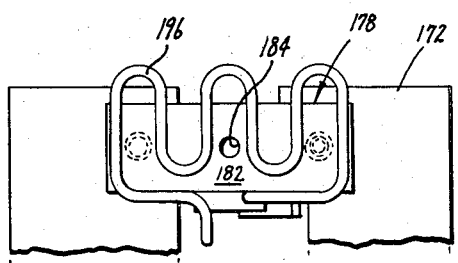
FIG. 15 is a bottom view of the oil pump of FIG. 14.

Pump unit 178 comprises a fluid pump, such as a conventional gear-type pump, not shown, mounted within a housing 182 and with a pump inlet 184 underneath the housing, as best seen in FIG. 15. The pump is driven by a suitable electric motor 186 mounted for movement with the pump housing on an upwardly extending bracket 188. The motor is mounted at a sufficient elevation above the pump unit so that the motor is clear of the melted oil after the pump has dropped to its lowermost position. The pump is driven from the motor by a suitable drive shaft, not shown, extending along bracket 188.

A lift knob or handle 190, FIGS. 4 and 13, is secured to bracket 188 and is slideable in a vertical guideway 192 formed in a plate 194 secured to frame 12. When it is desired to remove or insert an oil bucket 162, lift handle 190 is raised until the lower end of pump unit 178 clears the bucket. With the new bucket in place the pump is lowered until it rests on the seasoning oil within the bucket.

The room temperature, solidified seasoning oil is melted for pumping by heating elements 196 and 198, which may be conventional electrical resistance-type heating elements in suitable tubing or the like and connected in the control circuit. Lower heating element 196 is coiled in a serpentine path for melting oil at the base of the pump unit. The purpose is to both melt oil around pump inlet 184 for rapid start-up, and also to melt a path down through the seasoning oil as oil is consumed and the pump gradually moves downwardly. Heating element 198 extends vertically in a serpentine path or the like along telescoping feed tube 168, and may be of the conventional electrical resistance-type heater. The purpose of heater 198 is to both heat the oil within feed tube 168, which may have solidified after a length of time following a previous pumping cycle, and also to melt a path through any solidified oil which may be above pump housing 182 during start-up so that pump operation can draw air down, thus preventing pump cavitation. After machine operation progresses for a number of pops, the heaters will gradually melt the entire oil in the bucket so that the pump moves downwardly through the oil to the bottom of the bucket.

A pair of normally closed limit switches 200, 202 are mounted on frame 172 adjacent telescoping support 170. Switch 200 is connected to cut off the circuit to pump motor 532, and switch 202 resets the operating cycle, when the pump unit is raised to its uppermost position. A switch-operating cam 204 mounted at the lower end of bracket 188 is in registry with and operates the switches 200, 202 in its raised position. This provides a safety feature so that the pump is automatically turned off when raised out of the bucket.

The oil is pumped under pressure upwardly through outer telescoping feed member 174 into fitting 206 connected with the lower end of feed line 164, as illustrated in FIG. 13. Feed line 164 guides the oil upwardly along the rear corner post of the display case and across to inlet 208 of oil reservoir 166. The overflow from oil reservoir outlet 210 is directed through overflow conduit 212 adjacent to the inlet conduit, down the corner post of the display case and directly over the oil bucket which it empties into through outlet 214 opening directly to atmosphere.

OIL RESERVOIR AND METERING SYSTEM

Figure 16:
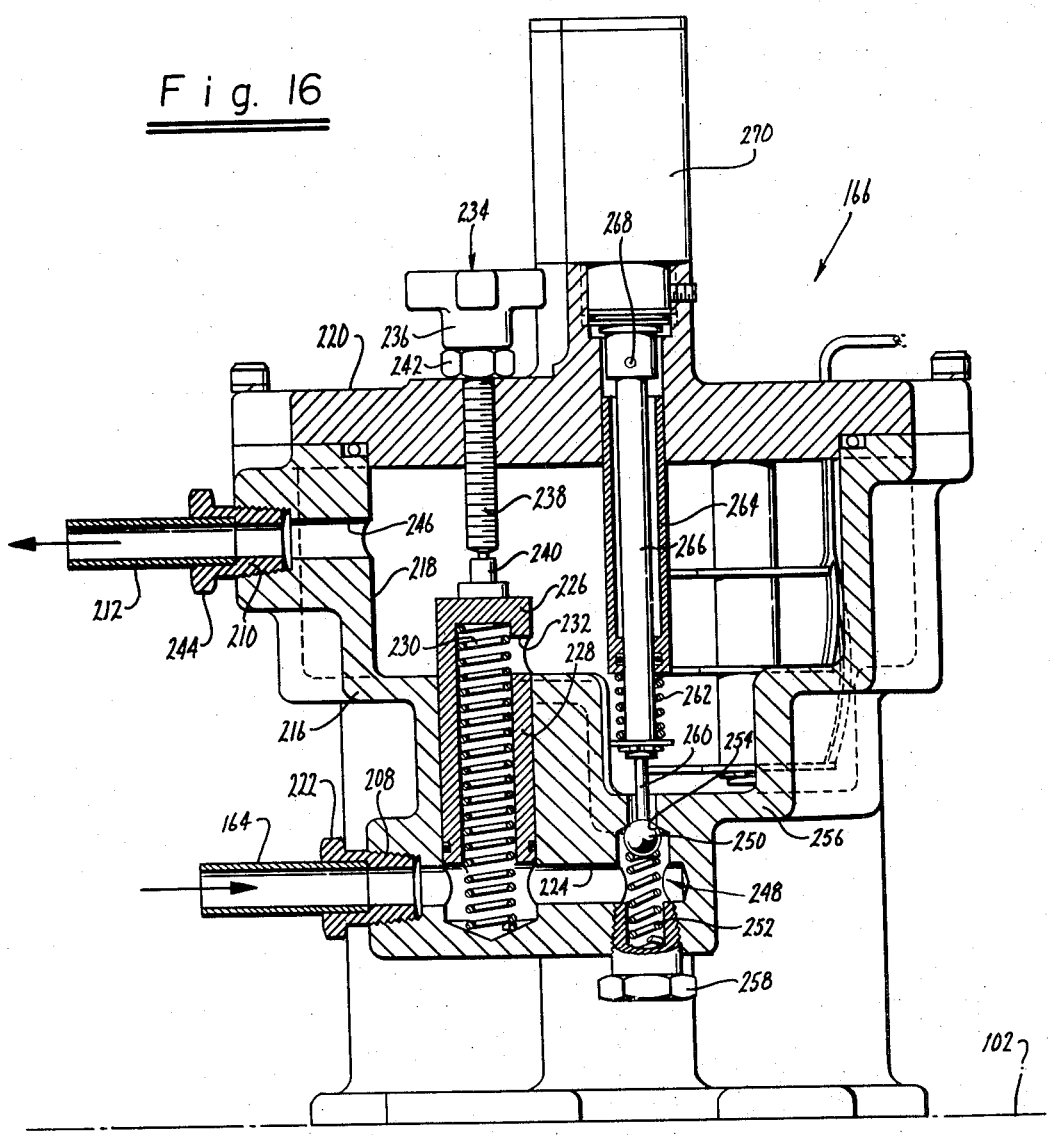
FIG. 16 is an elevation sectional view of the oil metering assembly taken along the line 16—16 of FIG. 6.

Referring to FIGS. 16 and 17, oil reservoir 166 includes a housing 216 defining a cavity or sump 218 closed at its upper end by cover plate 220. Reservoir inlet 208 is connected with oil feed line 164 by means of fitting 222, and communicates with a transverse bore 224 formed in the housing. Bore 224 in turn communicates with a hollow level-adjusting tube 226 slideably mounted in the housing in vertical bore 228. Adjusting tube 226 is closed at its upper end and retains a compression spring 230 functioning to yieldably urge tube 226 upwardly. A draining hole or opening 232 formed in the side of tube 226 provides communication between reservoir cavity 218, the interior of tube 226, and bore 224.

An adjusting mechanism 234 is provided to selectively adjust the vertical position of tube 226 and thereby adjust the level of drain 232. Adjusting mechanism 234 comprises an adjusting knob 236 adapted to turn shaft 238 threadably mounted in cover plate 220 directly above the end of tube 226. A pivoting shoe 240 mounted on the end of shaft 238 bears against the end of table 226. A lock nut 242 is provided to lock the shaft and level adjustment tube in the selected position. The adjustable drain level of the invention is more accurate in charge measurement than previous methods employing pumps, etc. where temperature variation or inaccurate pump shut off affects filling volume. Also, the invention provides a degree of safety in atuomation wherein only a measured amount of oil can be displaced into the pot on each cycle without the possibility of overfilling or overpumping.

Reservoir outlet 210 is connected with overflow conduit 212 by means of fitting 244 and communicates with the reservoir cavity through bore 246.

A spring-loaded ball check valve 248 is provided to prevent trapped seasoning oil from hardening in the reservoir during shut-down. Valve 248 includes a ball 250 yieldably urged upwardly by means of spring 252 within bore 224. A drain plug 258 is provided for retaining spring 252 in position. Check valve 248 is normally held in open position during shutdown by means of drain shaft 260 contacting ball 250 at its end and yieldably urging the same downwardly by means of spring 262 mounted below drain shaft housing 264. Drain shaft 260 includes an upwardly extending portion 266 slideably mounted in housing 264 and connected at its upper end 268 with electrically operated solenoid 270. Throughout the operating cycles of the machine solenoid 270 is operated to draw drain shaft 260 upwardly permitting drain valve 248 to close. During machine shut-down, solenoid 270 is de-energized permitting the spring to urge drain shaft 260 downwardly and open valve 248. Any oil remaining in the reservoir will drain through the valve and thus cannot solidify in the reservoir. This prevents the reservoir and metering device from malfunctioning and permits rapid start-ups without the requirement of heating the entire metering assembly and solidified oil.

A dump valve assembly 272, FIG. 17, is provided to direct the metered amount of oil into the popper at the cycle time as influenced by the control circuit. The dump valve assembly includes a valve head 274 carried on valve stem 276 and yieldably urged into sealing engagement with valve seat 278 by spring means 280. The valve stem in turn is connected at 282 with electrically operated solenoid 284. When energized, solenoid 284 lifts valve head 274 from seat 278 to open communication between the reservoir cavity and bore 286 in registry with an oil inlet opening 288 formed in plate 102. The oil inlet is at a radial position clearing rotary valve apparatus 106 for directing oil into pot 18 by gravital flow.

An oil level sensing device 190 is provided to sense oil level in the reservoir and signal the control circuit for cycle functions. In the preferred form, the sensors comprise three horizontal, vertical spaced capacitor plates 292, 294 and 206 positioned at predetermined levels within the reservoir. Electrical leads 300, 302 and 304 attached to respective condenser plates signal the control circuit as the oil level rises above at least two of the plates.

Assuming that dump valve 272 is closed and check valve 248 is closed for cycling, the control circuit will signal pump 178 to pump oil through inlet 208 and drainhole 232 to fill the reservoir. As the oil level gradually rises to a level which covers both plates 292 and 294, the capacitors signal the control circuit to start the popping cycle. The pump continues to fill the reservoir until the level rises above plate 296, and this signals the control circuit to terminate the pumping operation. Should the pump fail to stop for any reason the overflow will harmlessly return to the oil bucket through outlet 210 and conduit 212. Also, the control circuit is timed to shut off after 10 seconds of operation to prevent damage to the pump should the pump run dry. It has been found that approximately 5 seconds is sufficient time for the pump to fill reservoir 166.

After the control circuit has signaled the pump to stop, oil will start to drain backwards through the drain hole 232, bore 224, inlet 208, and feed tube 164 to pump 178. Pump 178 is provided with a conventional bypass opening, not shown, through which this oil will drain. The oil continues to drain until it reaches the lower portion of drain hole 232. The amount of oil in the reservoir is now at the pre-selected amount which has adjustably been set into the metering device through adjustment of mechanism 234. Following this, the control circuit signals solenoid 284 to operate for opening dump valve 272 and permit this quantity of oil to drain into the pot. In the preferred embodiment, the maximum extent of downward travel of level adjustment tube 226 is such that drain hole 232 is positioned so that a minimum setting of 4 ounces of oil will be injected. The upper extent of tube 226 travel provides a maximum of 10 ounces of oil.

POPPING POT AND DISCHARGE APPARATUS

Popping pot 18 is positioned in the display case below support plate 102 for receiving the corn, salt and oil charges, for discharging steam and waste oil upwardly into condenser outlet 306 for delivery to condensing system 308, for receiving inlet air through evacuation inlet 310, and for evacuating popcorn through outlet conduit 312 and downwardly into the display case through tube 46, as best seen in FIG. 10. Pot 18 comprises a bottom hot-plate and agitator assembly 314 pivotally mounted at 316 to a housing 218, shown as cylindrical, mounted below support plate 102 by suitable means, such as bolts 320. The lower edge of the housing is mounted in sealing engagement with a groove 322 provided in angular support rim 324. Evacuation conduit 312 extends through an opening 326 in housing 318 downwardly to an opening 328 radially centered in the pot and spaced above hot plate 314 at a height sufficient to permit popped corn to be swept upwardly through the conduit by a stream of air. Conduit 312 extends outwardly from the pot through an opening 330 provided in upper cylindrical portion 332 of cone 46, where it angles to a downwardly facing discharge outlet 334. Corn exiting from the pot through conduit 312 cascades downwardly through cone opening 124 into the display case.

Hot-plate and agitator assembly 314 includes a casting 336 of flat, circular configuration embedded with a suitable heating element 338, such as a conventional electric resistence element connected by suitable leads, not shown, with the control circuit. A lower cover plate 340 is secured beneath the hot plate as a precaution against injury to the operator. Upper annular rim 342 of casting 336 is in sealing engagement with housing rim 324 preventing escape of steam and waste oil from the pot. A locking mechanism 344 mounted on rim 342 at a diametral position from pivot 316 secures hot-plate assembly 314 against housing rim 324 throughout a series of popping cycles. The locking mechanism prevents unauthorized or accidental opening of the pot during popping, inasmuch as it is not necessary to open the pot for either charging or popcorn removal. For cleaning purposes, locking mechanism 344 is released permitting hot-plate assembly 314 to pivot downwardly at 316.

Figure 11:
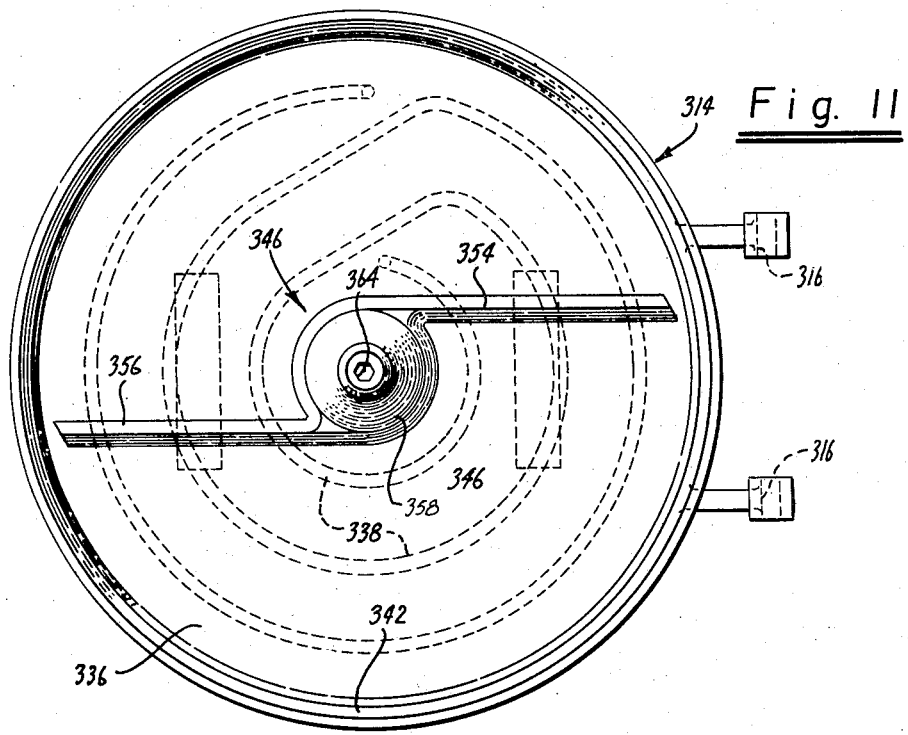
FIG. 11 is a fragmentary top plan view of the agitator and hot plate assemblies.

An agitator assembly 346 is mounted above hot-plate casting 336 for stirring the corn kernels during popping and sweeping the popped corn inwardly for evacuation. The agitator assembly includes a central hub 348 rotatably mounted on an upwardly extending spindle 350 supported in a recessed portion 352 of casting 336. A plurality of outwardly extending, generally flat blades 354, 356 are mounted for rotation with the hub in a clockwise direction as viewed in FIG. 11. The sharpened forward edge of each blade has a radially outward forward rake with respect to the axis of rotation. This provides a radially inward sweeping action to move the popcorn towards hub 348 for more efficient evacuation through conduit 312. The lower base portion of hub 348 is provided with an outwardly flaring skirt 358 functioning to direct the stream of air upwardly into conduit opening 328 during corn evacuation.

Agitator assembly 346 is rotated by drive assembly 360 extending downwardly from above the pot. The drive assembly includes a shaft 362 having a preferred hexagonal cross-sectional configuration and slideably locking with a hexagonal female socket 364 provided at the upper end of agitator hub 348. Shaft 362 is spring-loaded from above by suitable means such as compression spring 366 mounted within a sleeve 368. Sleeve 368 in turn is secured to a broached hexagonal nut 370 keyed for rotation with drive shaft 372 extending downwardly through a quill shaft 374 of drive assembly 376 provided for operating rotary valve apparatus 106. Drive shaft 372 is driven from a preferred electric motor 378 during the popping cycle by suitable means, such as a worm gear arrangement, not shown. The lower end 382 of hexagonal shaft 362 projects through an opening 384 of the evacuation conduit, and is aligned with agitator socket 364 for driving engagement when hot-plate assembly 314 is closed, as illustrated in FIG. 10. When the pot is opened for cleaning, downward pivotal movement of the hot-plate and agitator quickly uncouples drive assembly 360 at the socket connection. When the hot plate is returned and locked in place the shaft and socket will lock in driving engagement where there is correspondence between their angular positions. If shaft 362 does not engage in the socket, it is urged upwardly against the spring which forces them in locking engagement upon start-up of agitator motor 378. As a result, any angular or vertical misalignment between the shaft and mating socket will not prevent engagement of the agitator drive, thus simplifying opening and closing of the pot for cleaning.

ROTARY VALVE APPARATUS

Figure 18:
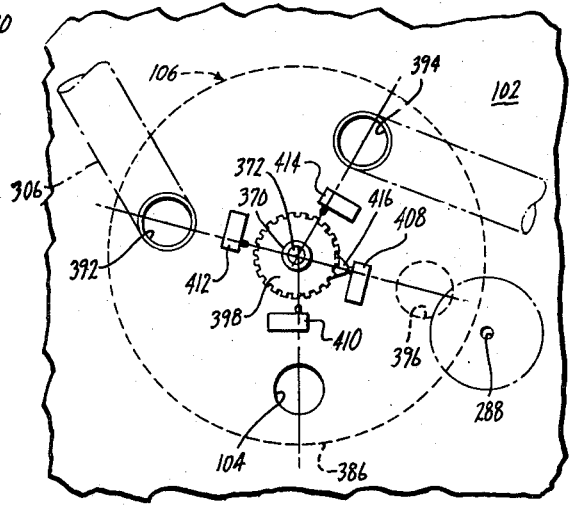
FIG. 18 is a fragmentary top plan view illustrating an operating position of the rotary valve disc with respect to its associated ports controlling the processes for the pot, and including the control switch positioning.

The rotary valve apparatus 106 provides an accurate valving of the various processes into and out of pot 18 in timed relationship with a predetermined program under influence of the control circuit. The valve arrangement of the invention provides a mechanical memory to assist the electronic system to prevent loss of cycle position during power failure or accidental shutoff. The valve apparatus includes a generally flat valve plate or disc 386 mounted for rotation with drive assembly 376 within the top of pot housing 318. A mounting plate 388 supports the valve plate to a flange 390 of quill shaft 374 by suitable means, such as a plurality of mounting screws or the like. Valve disc 386 extends outwardly with a radius sufficient to cover a series of openings provided in the top of pot housing 318 and support plate 102. As illustrated in FIGS. 10 and 18, these openings include a condenser outlet opening 392 connected with condenser conduit 306, an air inlet 394 connected with evacuation inlet conduit 310, and opening 104 connected with throat section 98 of corn and salt hopper 58. An opening or disc hole 396 is formed in disc 386 uncovering openings 104, 392 and 394 in accordance with the circuit program. A screen 393 covers opening 392 and prevents corn from entering conduit 306.

Figure 9:
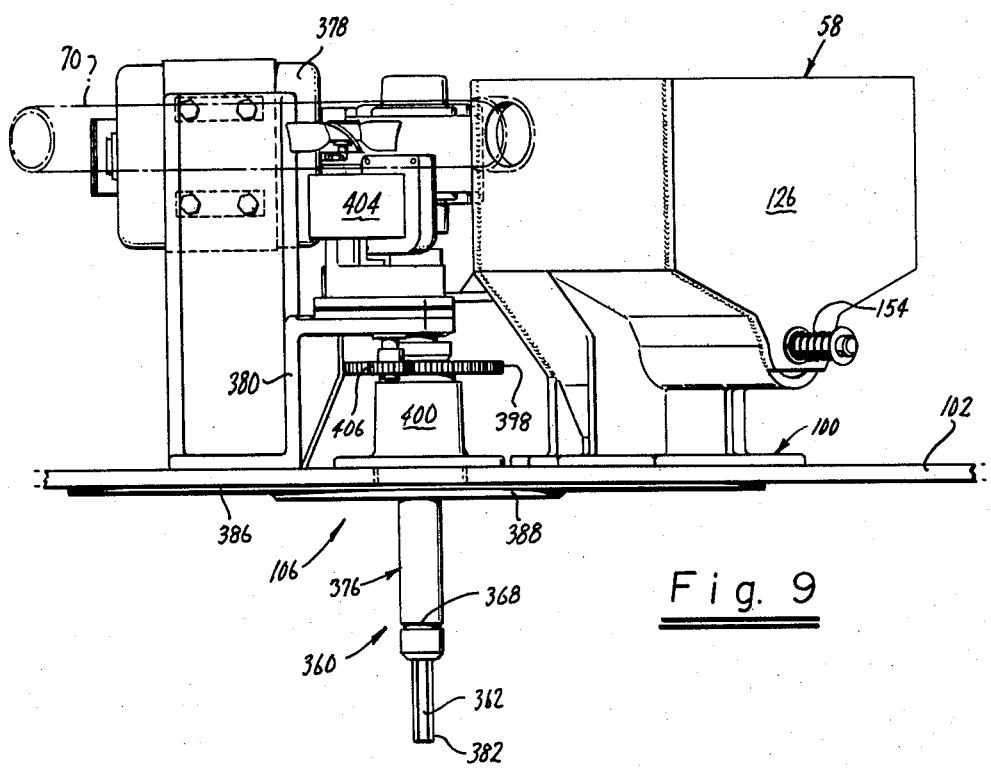
FIG. 9 is a fragmentary elevation view, partially in cross section, taken along the line 9—9 of FIG. 6.

Valve drive assembly 376 includes a gear 398 keyed to quill shaft 374, which in turn is journaled for rotation within an upstanding sleeve 400 mounted above opening 402 provided in support plate 102. Gear 398 is driven by suitable means such as an electric motor 404 mounted on bracket 380 and in driving connection with the gear through a suitable pinion gear 406, or the like, as illustrated in FIG. 9.

Different processes of the control circuit are triggered by a plurality of switches actuated responsive to gear 398 rotation, and therefore in exact timed relationship with rotation of valve plate 386. Referring to FIG. 18, a start switch 408, a fill switch 410, a cook switch 412, and an evacuation switch 414 are mounted on a suitable bracket, not shown, around the periphery of gear 398. Start switch 408 is positioned on a radial line bisecting the angle between fill opening 104 and evacuation inlet 394. Fill switch 410 is positioned on line with fill opening 104. Cook switch 412 is positioned on line with condenser outlet opening 392. Evacuation switch 414 is positioned on line with evacuation inlet 394. These switches are actuated by suitable operating means on gear 398, shown as a switch operating roller or cam 416 attached to the gear and positioned on a line centered on disc hole 396.

Referring to the schematic circuit diagram of FIG. 19, switches 408, 410, 412 and 414 are illustrated connected in the control circuit for operating the circuit relays, timers and indicator lights, as explained in greater detail hereinafter.

EVACUATION OF EFFLUENT AND POPPED CORN

The system for evacuating the popped corn form the pot is illustrated in FIGS. 6 and 10 and includes a blower fan 418, preferably of a type including a nonclogging paddle impeller. The fan is driven by suitable means such as an electric motor 420 through a suitable belt and pulley drive arrangement 422. The fan inlet opens above a cover plate 424 mounted over opening 426 above cylindrical portion 332 enclosing popcorn discharge 334. The fan dischrages at connection 428 into evacuation inlet conduit 310.

When valve disc opening 396 is in vertical registry or alignment with evacuation inlet opening 394, blower 418 is energized to draw intake air from cone 46 and direct it into the pot through conduit 310 and opening 394. A deflector plate 430, preferably of a flat, circular configuration, is mounted within the pot by suitable means, such as a bracket 432 secured to the outside of conduit 312 at a position spaced directly below inlet 394. Deflector plate 430 functions to direct the incoming air stream outwardly and downwardly around the inside periphery of the pot in a sweeping motion. This enhances the efficiency of popcorn evacuation so that the air stream sweeps the popcorn across the bottom of the hot-plate, upwardly into evacuation conduit 312, and downwardly through cone 46 into the display case. The stream of air issuing from outlet 334 in cone is recirculated and drawn upwardly through the blower intake. During this evacuation cycle, valve plate 386 closes off condenser outlet 392.

After a filling cycle with the corn and salt charged into the pot, motor 404 indexes valve disc 386 until valve hole 396 opens communication with condenser outlet 392, and at the same time cam roller 416 actuates switch 412 to initiate the cook cycle. The control circuit actuates solenoid 284 of oil reservoir 166 for dumping the charge of seasoning oil through opening 288 into the pot. As the cooking cycle continues, the oil is heated by the hot plate while the agitator rotates.

Steam driven from the corn and waste oil evolved within the pot are removed through outlet 392 into condenser system 308. During the cook cycle, motor 404 stops the valve disc with its opening at the condenser outlet position until the corn is popped and the control circuit initiates the evacuation cycle.

STEAM AND WASTE OIL CONDENSING SYSTEM

Condensing system 308 is adapted to draw the steam and waste oil effluent from the pot by vacuum, and to condense the same by self-cleaning action without escaping into the surrounding room. The condenser system comprises an upstanding shell 434 mounted at the rear of frame 12. Effluent from the pot is directed through conduit 306 into an upper inlet header 436 communicating with a plurality of downwardly extending heat exchange tubes 438. The tubes 438 communicate at their lower end with a chamber 440 for reverse flow upwardly along a plurality of upwardly extending heat exchange tubes 442 discharging into outlet header 444 and outlet tube 446.

A partition 448 divides shell 434 into two air channels 450 and 452 enclosing respective tubes 442 and 438. Cooling air from a condenser blower 454, as best seen in FIG. 4, is supplied from within lower section 14 of the machine and directed into inlet opening 456 of shell 434. The cooling air is forced upwardly for cooling and condensing the steam and waste oil. Opening 458 in partition 448 combines the flow from channel 452 with that of channel 450 for delivery through a venturi or narrowed throat section 460 adjacent the discharge end of tubes 442. The increased air flow and lowered static pressure at the venturi creates a vacuum within tubes 442 acting to draw the steam and waste oil through the condenser tubes from the pot in the flow path illustrated in FIG. 5.

Condensed steam and oil droplets forming on the inside surface of the condenser tubes drop downwardly by gravity to collect on the bottom of chamber 440 where it drains through outlet 462 into a removable condensate drain pan 464.

Figure 20:
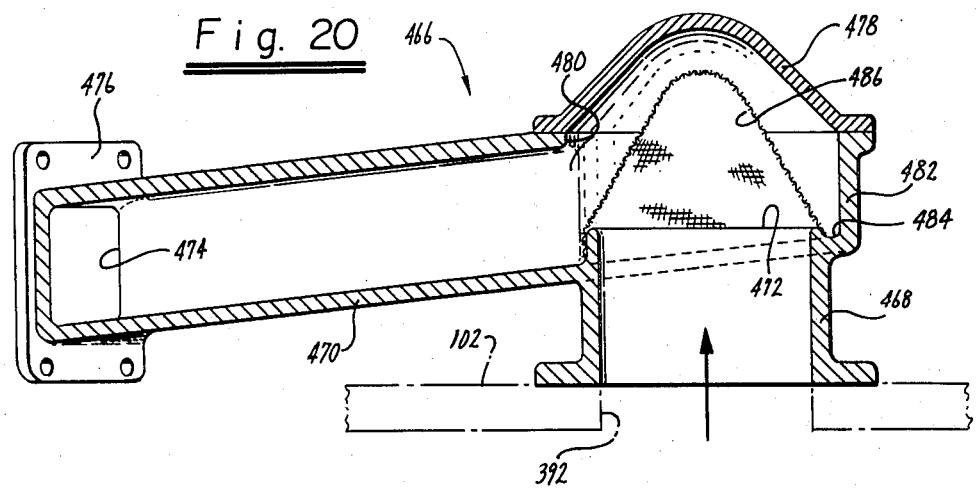
FIG. 20 is a vertical section view of a modified form illustrating a steam condenser connected between the pot outlet and main condenser.

FIG. 20 illustrates a modified form embodying a steam condenser, illustrated generally at 466. Condenser 466 replaces outlet conduit 306 between condenser outlet 392 and condenser header 436 in the preferred form of FIG. 6, and functions to immediately condense steam as it leaves the pot. The water condensate is collected and drained away preventing its return to the pot. This results in a dryer popcorn having improved flavor and tenderness.

Condenser 466 comprises an upwardly extending tube section 468 mounted over condenser outlet 392 on support plate 102. Conduit section 470 encloses at one end upper lip 472 of the tube and extends downwardly therefrom to an outlet 474 mounted to the inlet of condenser header 436 by suitable fasteners provided on mounting flange 476. A dome or cap 478 is mounted above an opening 480 provided in conduit 470 directly above the tube. Tube lip 472 is radially spaced inwardly from conduit end portion 482 to define a collecting gutter 484. A conical screen 486 mounted above tube lip 472 prevents kernels of corn from entering the condenser air stream. In operation, steam and waste oil particles drawn from the pot by the vacuum created in the condenser during a cooking cycle enters tube 468 and impinges on both screen 486 and the inner surface of cap 478. The lower temperatures of these elements functions to condense the steam which collects and runs downwardly into gutter 484, the lower surface of conduit 470, and through tubes 438 of condenser 308 for delivery into condenser outlet drain 462. After the cooking cycle, when the condenser outlet is closed by the valve plate, the elements of condenser 466 lose the heat received from the condensed steam and cool down for the following cooking and condensing cycles.

REMOVAL OF "OLD MAIDS"

In the form of the invention illustrated in FIGS. 1–4 the "old maids" or unpopped kernels are removed from pot 18 along with the popcorn and are delivered into display case 16 where they fall onto screen 44. The kernels either drop through the screen into fine collector tray 488 unassisted, or else are scraped onto the screen by the operator. From tray 488 the kernels are directed through fine chute 490 downwardly into removable bin 492 provided at the bottom of the frame.

Figure 21:
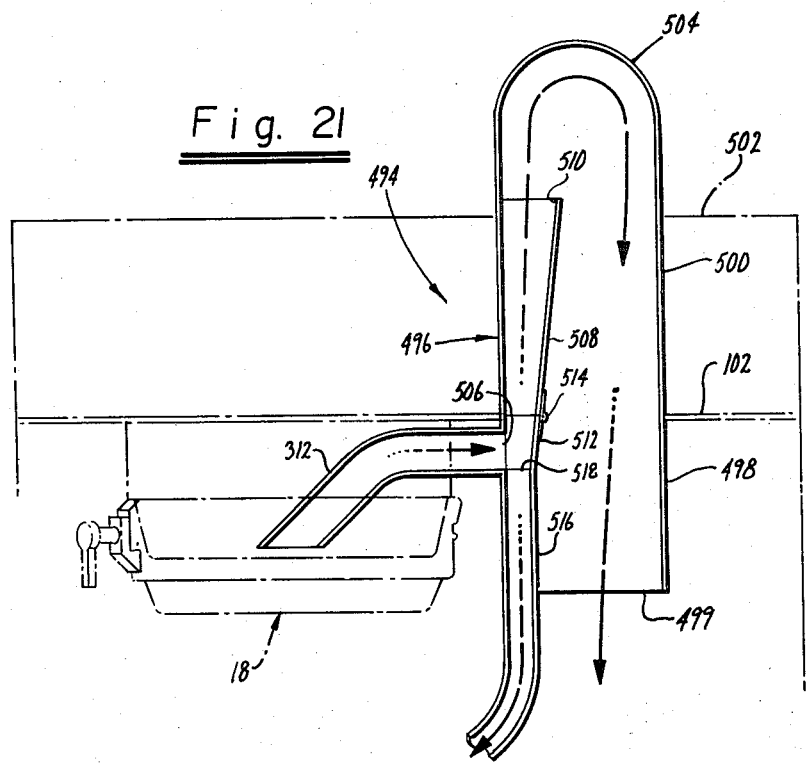
FIG. 21 is a fragmentary sectional view of a modified form illustrating a trap for removing "old maids" from the air current evacuating popcorn from the pot.

In the modified form illustrated in FIG. 21, an alternate "old maid" removal system is indicated generally at 494. This system comprises a kernel trap device 496 including a lower tubular portion 498 extending downwardly through an opening in support plate 102 into the display case and opening underneath at 499. An upper tube extension 500 projects above plate 102 into upper machine section 20. The trap may extend through an opening in top cover 502 with a transparent top cover or dome 504 of a suitable material, such as Lucite plastic. This provides an attractive display of popcorn moving upwardly during an evacuation cycle. Popcorn issuing from the pot through evacuation conduit 312 enters the trap through inlet connection 506 and is deflected upwardly by means of partition 508. This partition comprises a vertical section of a cone removably attached within trap 496 and with its small end adjacent inlet 506 and its large end 510 opening upwardly within the tube. A lower section 512 of the partition is lockably hinged at 514 for cleaning purposes and extends downwardly in abutting relationship with a tubular chute 516 extending downwardly from the trap to direct the "old maids" into bin 492 for subsequent removal.

In operation during an evacuation cycle, the popped corn and "old maids" are directed upwardly through conduit 312, then into opening 506 of the trap. The popcorn is deflected upwardly by partition 508 and carried in the channel between the tube and partition by the air stream until it cascades over upper end 510 and falls downwardly into the display case. The velocity of the air stream is high enough to blow the popcorn upwardly but insufficient to lift the "old maids," which instead are carried by gravity downwardly through opening 518 into chute 516. As a result, the "old maids" are automatically removed from the popped corn.

AUTOMATIC CONTROL CIRCUIT

Figure 19A:
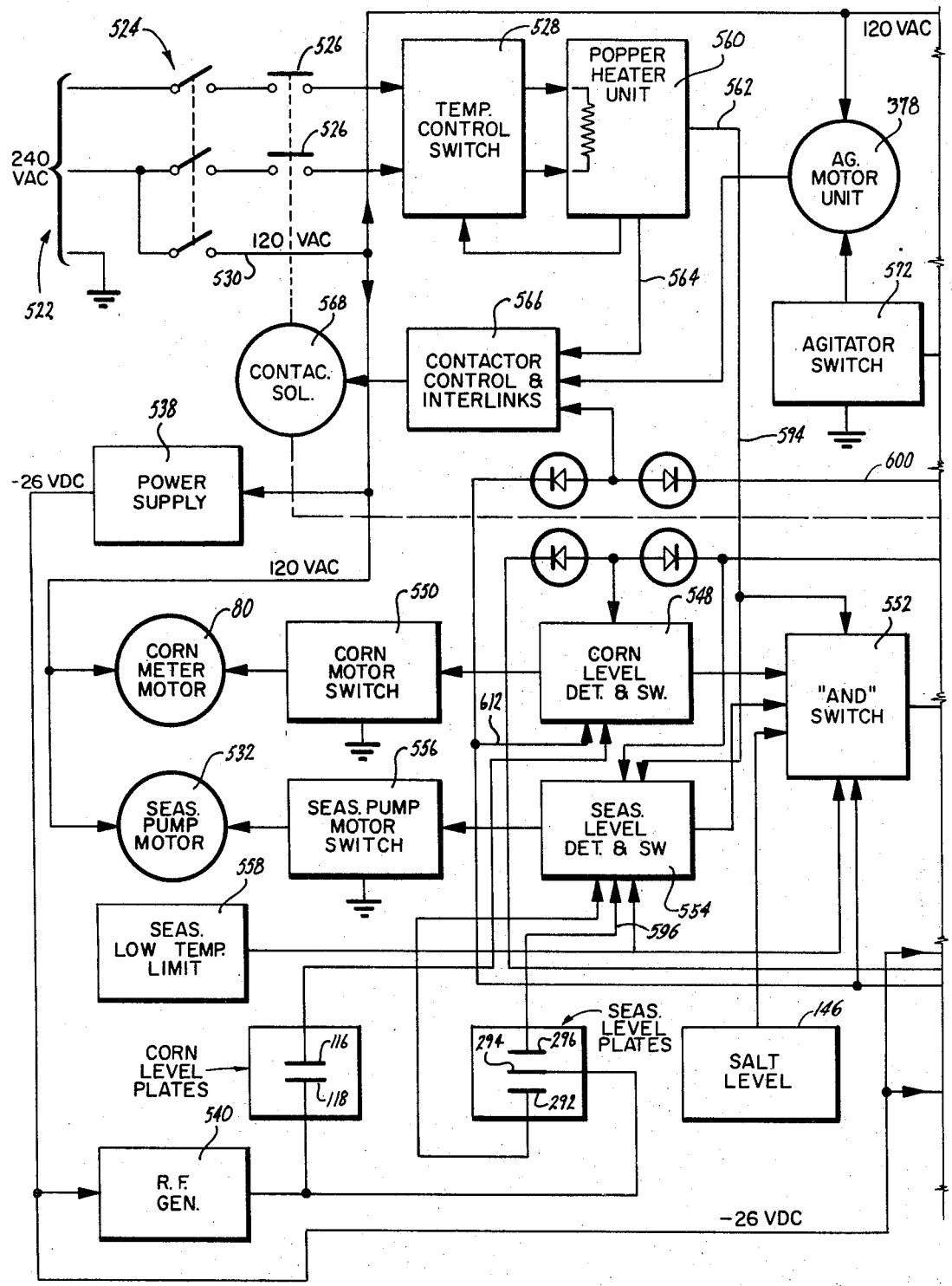
FIGS. 19 A and B comprise a sehcmatic diagram of the control circuit for the invention.
Figure 19B:
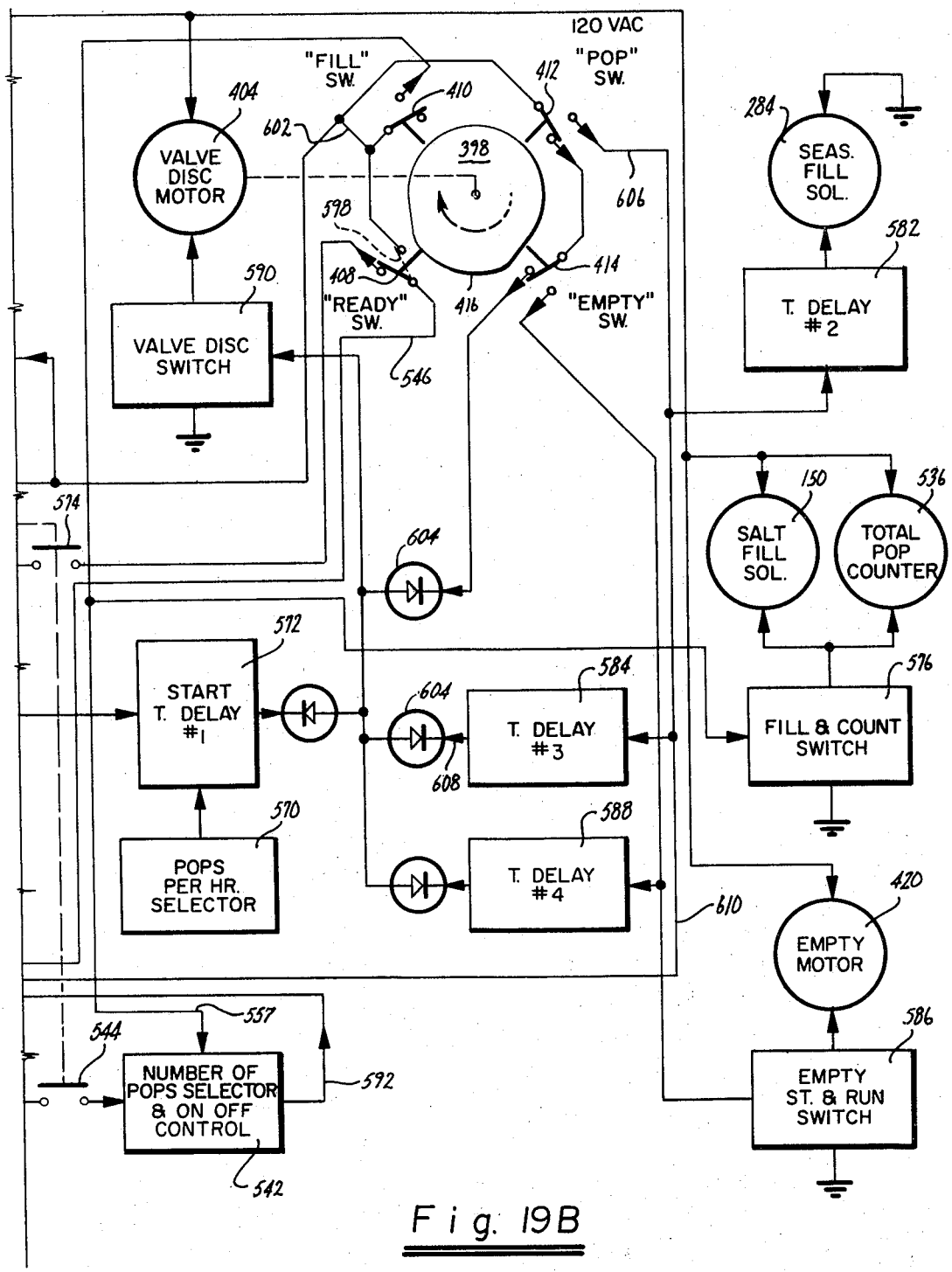

Referring to FIG. 19, a schematic diagram for automatic control circuit 520 is illustrated. A suitable alternating current electric energy source 522 connected with main circuit breaker or switch 524 provides the range of voltages required with the invention. For heating the hot plate heater 338, the circuit provides 240 VAC through the contacts of start switch or button 526 and temperature control switch 528 adapted to regulate plate temperature preferable at 410°F. Power at 120 VAC is provided at 530 for operating various control elements including agitator motor 378, valve disc motor 404, corn meter motor 80, seasoning pump motor 532 operating pump 178, motor 420 for powering emptying or evacuation blower 418, salt fill solenoid 150, and "total pop counter" 536. The voltage from source 530 also operates power supply 538 providing a suitable direct current control voltage, such as 26 VDC. This voltage powers the R.F. generator 540 connected with both corn level capacitor plates 116, 118 and seasoning level plates 292, 294 and 296. This DC voltage further powers the "number of pops selector" control 542 through relay 544 and provides an input 546 for start switch 408 and remaining elements of the circuit.

A corn level detector and switch 548 is provided for actuating switch 550 and corn meter motor 80 responsive to a signal from capacitor plates 116, 118 indicating that corn resupply in hopper 58 is required. If the corn supply is adequate for one or more pops, a signal is directed into start/complete "and" switch 522.

A seasoning level detector and switch 554 is provided to signal seasoning pump motor switch 556 and seasoning pump motor 532 to fill oil reservoir 166 responsive to a signal from seasoning level condenser plates 292, 294 and 296. Upon completion of the oil filling cycle, a signal is directed from switch 554 into "and" switch 552.

Salt level switch 146 provides a signal to "and" switch 552 for continued cycling only if sufficient salt is in bin 136 for the following popping cycle. The "number of pops" selector 542 also provides a signal into switch 552 for recycling of the popping cycle only where the number of pops selected by the operator exceeds the totla pop count received at input 557 following each energization of fill switch 410. The recycle signal from selector 542 also triggers operation of corn level detector 548.

The seasoning temperature is measured by low temperature limit switch 558 which directs a signal to both seasoning level detector/switch 544 and switch 552 when the temperature of the oil is high enough for pumping and circulation. Popper heater unit 560 provides a signal at 562 for both "and" switch 552 and seasoning level detector/switch 554 as a low temperature limit below which the cycle should not proceed. Popper unit 560 provides a high temperature limit signal 564 into contactor control and interlink unit 566 above which temperature contactor solenoid 568 is dropped out to open switches 526 and discontinue heating current.

A popping rate or "pops per hour" selector 570 is provided to selectively vary the time delay between pops by controlling start time delay switch 572. Switch 572 functions to close within a range of time, for example from 10 seconds to 8 minutes, after receiving a start signal from switch 552. This provides automatic popping rate control which can be selectively changed at any time, depending upon popcorn consumption, without affecting the other settings.

Actuation of start or ready switch 408 to its normally closed position 598 triggers agitator switch 572 for operating agitator motor 378, and conditions contactor control 566 for operation. Actuation of switch 408 to the illustrated start or ready position by cam 416 triggers operation of corn level detector/switch 548 when relay 574 is closed by contactor solenoid 568. The normally closed position of switch 408 operates as a hold circuit for contactor control 566 holding solenoid 567 energized to close relays 526, 544 and 574.

Operation of fill switch 410 by cam 416 triggers both fill and count switch 576 and directs a count signal 557 into pops selector 542. Switch 576 in turn actuates salt fill solenoid 150 and total pop counter 536.

With cook or pop switch 412 in its normally closed position, and with start switch 408 in its normally closed position, a circuit is completed from power input 546 through switches 408, 412 and 414 for actuating valve disc switch 590 and operating motor 404 to rotate the valve disc past the fill position unitl it reaches the cook position. When cook switch 412 is actuated by cam 416, time delay 582 is triggered for operating seasoning fill solenoid 284, which automatically turns off within 10 seconds. The circuit to switch 590 is opened for stopping the disc at the cook position. Switch 412 further operates time delay 584 which closes within 2-3 minutes to then actuate switch 590 and motor 404 to rotate the disc to the evacuation position, where it stops during popcorn evacuation.

When the evacuation or empty switch 414 is operated by cam 416 to its "empty" position, a signal is directed to energize the empty start and run switch 586 which energizes blower motor 420 for emptying popcorn from the pot. A signal is also directed into normally open time delay switch 588 which closes after a predetermined time delay of, for example, 35 seconds. When switch 588 closes, switch 590 is closed to operate motor 404 to rotate the valve disc back to the start position.

OPERATION

Assuming that the machine is initially cold and that the corn bin, oil bucket and salt hopper have been replenished, operation is initiated by closing main switch 524. This directs power to start button 526, to seasoning heaters 196, 198, and to the lights and operating switches of control panel 48. Main switch 524 also turns on blower motors 62 and 454 for continuous operation.

Pop selector control 542 is then adjusted to the desired number of pops. An indicator light, not shown, associated with this control indicates which pop in the cycle the machine is at, and the selector pointer indicates at which pop it will stop.

Pop rate selector 570 is adjusted to vary the popping rate by adding different time delays between pops. For example, a 10-second delay would be provided for a rate of 15 pops per hour, a 2-minute delay for a rate of 10 pops per hour, and an 8-minute delay for a rate of 5 pops per hour.

AFter a sufficient warm-up time on the order of 15 minutes, the contacts of start button or switch 526 are closed by the operator. This directs power through temperature control switch 528 to popper heater unit 560. Relays 544 and 574 are also closed by the start button. Where the total number of pops in control 542 has been set at one or more, then a recycle signal 592 is directed into both switch 552 and contactor control 566. The signal to control 566 operates as a hold circuit through contactor solenoid 568, holding switch 526 closed if the high temperature limit signal 546 and agitator motor signal 594 indicate proper functioning of the heater and agitator.

Start switch 408 in the start or ready position of the valve disc is operated by cam 416 to direct power through relay 574 and into corn level detector/switch 548. With no corn in supply reservoir 82, capacitor plates 116, 118, signal switch 548 for closing switch 550 and operating corn meter motor 80 to inject a supply of corn into the air conveyor until the reservoir is filled to a position between the plates. This fill time takes approximately 2 ½ minutes, after which time a corn supplies indicator light, not shown, lights up.

Power is also directed through relay 574 into seasoning level detector/switch 554. During the warm-up period, the heaters surrounding pump unit 178 have melted a sufficient amount of oil at the pump intake and within feed line 164. With no oil in reservoir 166, the seasoning level capacitor plates 292 and 294 signal switch 554 to energize switch 556 and seasoning pump motor 532, provided that the low temperature limit signal 562 from the heater unit indicates proper heater temperature and that the signal from seasoning low temperature limit 558 indicates proper seasoning temperature. Seasoning pump 178 operates to fill reservoir 166 until the liquid level is between plates 296 and 294, at which time a signal is produced at 596 into switch 552 for initiating the popping cycle, provided the remaining inputs to switch 552 are present.

When all conditions for initiating popping are present including the heater signal 562, corn level switch 548 indicating resupply of the corn reservoir, seasoning level switch 554 indicating resupply of the oil reservoir, salt level switch 146 indicating sufficient salt supply, and the number of pops is one or more, then a signal is directed to time delay switch 572. Switch 572 closes after the preselected time delay to direct a signal to switch 590 for energizing disc motor 404. This motor turns valve disc 106 to the fill position where valve opening 396 exposes fill opening 104. The corn in reservoir 82 drops by gravity and the air current from air conveyor conduit 70 through throat section 98 into the pot. The valve disc is driven past the opening 104 without stopping and cam 416 momentarily actuates fill switch 410 to trigger fill and count switch 576 for actuating salt fill solenoid 150 and total pop counter 536. Solenoid 150 moves charging valve 134 to drop the salt in valve cavity 156 into the air stream which carries it into the pot. At the same time, switch 410 triggers a pop count signal 557 to reduce by one the number of pops set into selector control 542.

After the valve disc leaves its start position, cam 416 releases start switch 408 to its normally closed position at 598, directing power into agitator switch 572 for operation of the agitator motor, and into circuit 600 as a hold circuit into contactor control 566 and solenoid 568.

Operation of start switch 408 to the position at 598 also directs power through circuit 602, through the normally closed switches 412 and 414, and through diode 604 into valve disc switch 590 for continued operation of disc motor 404 up to the cook position.

When the valve disc drives to the cook position the circuit to switch 590 is opened by cam 416 stopping the disc with disc opening 396 opening communication with condenser outlet 392. Switch 412 then directs power through circuit 606 for operating time delay switches 582 and 584. Switch 582 operates seasoning oil fill solenoid 284 to open dump valve assembly 272 and drain the charge of oil into the pot through oil inlet 288. Time delay 582 opens the circuit to the solenoid after a time period of 10 seconds, which is adequate for draining a maximum oil charge of 10 ounces. Time delay switch 584 closes after a preselected time within the range of 2-3 minutes. This is the dwell time at which the disc is in the cook position, and this dwell time is selectively adjusted within the range as desired for varying cooking time. Switch 584 closes after the preselected time and directs a signal at 608 into valve disc switch 590 to start the disc towards the avacuation position. As the disc moves, cam 416 permits cook switch 412 to return to its normally closed position providing a hold circuit into switch 590 for continued disc operation.

Throughout the cooking cycle the corn is popped in pot 18 and steam and oil effluent is automatically removed through opening 392 and conduit 306 by the action of the vacuum created within condenser 308 by the air stream from continuously operating blower 454.

At the cook position of the disc, actuation of switch 412 also directs a signal through circuit 606 into branch circuit 610 to signal corn level detector and switch 548. Switch 548 has received a signal from plates 116, 118 indicating that resupply of corn reservoir 82 is required for the next cycle, and has also received a signal at 612 from pop selector 542 indicating that an additional pop is required. When these signals are received, switch 548 triggers switch 550 for operation of corn meter motor 80 to recharge the corn reservoir.

After the cooking cycle, the valve disc is rotated to the evacuation position, exposing evacuation inlet 394. When cam 416 reaches the evacuation position, switch 414 is actuated to trigger both empty switch 586 and time delay switch 588. Switch 586 operates empty blower motor 520 which directs an air stream into opening 394 sweeping the corn into evacuation conduit 312 for delivery to the display case. Movement of switch 414 from the normally closed position opens the circuit to valve disc switch 590 for stopping the disc at the evacuation position. After the predetermined time delay of 35 seconds switch 588 closes to direct a signal to switch 590 and start the valve disc moving to the start position. After cam 416 passes the evacuation position, switch 414 returns to its normally closed position, providing a holding circuit into switch 590 for continued operation of the disc.

When the disc reaches the start position, cam 416 actuates switch 408 to its open position, terminating power to the hold circuit for stopping the disc motor. At the same time, a signal is directed through switch 408 into relay 574 and seasoning level detector and switch 554. An absence of oil in reservoir 166 signals detector switch 554, which together with the signals from low temperature limit switch 558 and popper low temperature limit 562, trigger seasoning pump switch 556 for a repeat of the oil reservoir refill for a subsequent cycle.

The machine is stopped by turning pops selector 542 to the stop position for terminating signal 592. If stopped before the cook cycle has started, the control circuit will continue cycling and stop after the empty or evacuation cycle to insure that the effluent and popped corn has been completely removed from the pot. If the pop selector is turned to stop after the cook cycle has started, it will finish popping and then make one more popping cycle before a final stop. This leaves the machine in shut-down condition with no corn in upper hopper 58, and no oil in reservoir 166.

The following is a preferred timing chart indicating cycling times throughout one complete popping operation. It is understood that the cycle times are illustrative only and may be varied according to operating conditions and results desired. In this particular example, selector control 542 is set for two or more pops and rate selector 570 is set at 15 pops per hour.

| Time/Seconds | Condition or Operation | Program |
|---|---|---|
| 0 | Main switch on, start button pressed, all indicator lights on. | Start |
| 10 | Corn reset, seasoning reset, and start lights go out, indicating corn and seasoning charges ready. | Start |
| 12 | Disc motor drives past fill position, dumping corn as it passes. Salt solenoid fires when disc hole directly under hopper opening. | Fill |
| 14-16 | Disc motor turns disc to condenser outlet for cook cycle. On reaching cook position, dump valve for seasoning opens. | Fill |
| 16 | Corn metering motor starts. Condensing of steam and waste seasoning starts. | Cook |
| 26 | Seasoning dump valve closes. | Cook |
| 190 | Corn metering motor stops. | Cook |
| 200 | Disc motor turns disc to empty | Cook |
| 204 | Evacuation motor starts. | Empty |
| 236 | Evacuation motor stops. Disc motor turns disc to start position. | Empty |
| 240/0 | Corn, salt, and start lights go on and seasoning pump starts, with seasoning light on if cycle is to be repeated. | Start |

From the foregoing it is apparent that applicant has provided an improved popcorn popping machine fully automatic in operation, and which provides a popped corn product of improved flavor, tenderness and appearance. While the embodiments herein are considered to be preferred, it is understood that numerous variations and modifications in the steps, arrangement

We claim:

1. Apparatus for popping corn in heated seasoning oil, including the combination of: a pot for containing the corn and oil during popping, said pot defining an interior volume which is substantially closed throughout operation of the apparatus; first metering means to charge a predetermined amount of the corn into the pot; second metering means to charge a predetermined amount of oil into the pot; means for heating and cooking the oil and corn in the pot; means for removing steam and waste oil effluent from the pot during cooking; and, evacuator means for directing a stream of air to convey the popcorn from inside the pot outwardly to a display area.

2. Apparatus for popping corn in heated seasoning oil, including the combination of: a pot for containing the corn and oil during popping; first metering means including a corn hopper disposed above the pot to charge a predetermined amount of the corn into the pot; valve means for opening the closing communication between the hopper and pot; second metering means to charge a predetermined amount of oil into the pot; means for heating and cooking the oil and corn in the pot; means for removing steam and waste oil effluent from the pot during cooking; and, evacuator means for conveying the popped corn from inside the pot outwardly to a display area, the evacuator means including a conduit opening outside the pot, and air conveyor means directing a stream of air downwardly through said hopper when the valve is in open position to carry the corn into the pot, and provide a positive pressure in the hopper when the valve means is closed.

3. The invention of claim 1 and further including a main corn supply bin located below the pot and corn hopper for convenient resupply and for a cool storage location relative to the upper hopper; and, said air conveyor means includes an air conduit extending from the corn bin upwardly for discharge into the corn hopper, means directing a stream of air into said air conduit and hopper, and third metering means opening and closing communication between the corn bin and air conduit for metering corn thereinto for delivery through the conduit and resupply of the bin.

4. The invention of claim 3 and further including control means operating said third metering means, said control means sensing the corn level in said hopper for opening said communication responsive to a corn level below a predetermined level, and closing said communication responsive to corn filling the hopper to said level.

5. The invention of claim 4 and further characterized in that the control means sensing corn level comprises at least two capacitor plates spaced apart laterally within the hopper at said predetermined level, and said control means includes circuit means for generating a control signal for opening and closing of said communication between the bin and air conduit responsive to variation in capacitence between said plates during presence or absence of corn therebetween.

6. The invention of claim 1 and further including means for injecting salt into the pot comprising a salt bin mounted above the pot, the salt bin having a salt discharge spout, and a charging valve positioned below the salt bin and adapted for movement to and from a charging position in the air stream through the corn hopper, said valve having a salt retaining cavity in salt receiving communication with the spout when the valve is moved from the air stream, and the cavity moving into the air stream for depositing salt therein for charging the pot; and, control means for operating the charging valve to and from the hopper air stream.

7. The invention of claim 6 wherein the charging valve comprises a housing below the salt bin and a spool valve movable laterally within the housing into and from the corn hopper along an axis extending across the hopper, said spool valve including at least two lands defining therebetween said salt retaining cavity, the housing having an opening positioned between the salt spout and spool cavity with the valve moved from the hopper.

8. The invention of claim 6 and further including an air shield mounted within the air stream of the corn hopper extending over, and upstream of, the charging position of the spool valve, said shield having an opening downstream of the valve cavity permitting salt therein to enter and be carried by the air stream.

9. The invention of claim 6 and including means sensing an insufficient supply of salt for the following pop cycle to terminate the popping operation.

10. The invention of claim 9 and further characterized in that the means sensing salt supply includes a salt containing bin movable to a first position with said insufficient supply therein, and to a second position with a sufficient salt supply for the following pop, and circuit means terminating the popping operation responsive to the bin first position.

11. Apparatus for popping corn in heated seasoning oil in a pot, comprising the combination of: means for supplying oil to the pot including an oil supply vat positioned in the apparatus below the pot for convenient insertion and removal; an oil pump disposed in the vat and adapted to move on the level of solidified oil; reservoir means positioned above the pot; and, conduit means directing the oil under pressure from the pump upwardly to the reservoir means.

12. The invention of claim 11 and further characterized in that the conduit means includes an upstanding tubular member having an intake section adjacent the pump and mounted for vertical movement therewith, and an outlet section telescoping with the inlet section and fixedly mounted on the apparatus, the outlet section communication with the reservoir means.

13. The invention of claim 11 and further characterized in that the pump includes an upstanding bracket extending above the pump to a position clearing oil level in the vat with the pump at its lowermost position therein, means for driving the pump mounted at the upper end of the bracket and in driving connection with the pump throughout vertical floating movement thereof.

14. The invention of claim 11 and further including heater means carried with the pump for heating and melting the oil adjacent the pump inlet, said heater means further operating to melt a path in the oil coextensive with the plan profile of the pump for movement thereof downwardly into the solidified oil.

15. The invention of claim 11 and further characterized in that a pair of telescoping support members slideably support the pump for vertical floating movement in the oil, at least one of said telescoping members comprising said conduit means for directing the pumped oil into the reservoir means.

16. The invention of claim 15 and further including heater means adjacent said one telescoping member to heat and melt solidified oil therein, and to heat and melt solidified oil adjacent the heater for rapid start-up pump operation.

17. Apparatus for metering seasoning oil into the pot of an automatic popcorn popping machine, including the combination of: an oil reservoir mounted above the pot and having a discharge opening in communication therewith; means supplying oil under pressure into the reservoir for filling the same with a charge of oil; control means terminating operating of the filling means responsive to reservoir filling above a first predetermined level; means for draining oil from the reservoir down to a second predetermined level below said first level and defining a preselected oil volume in the reservoir for charging into the pot; and, means opening communication through the discharge opening for directing the oil charge to the pot.

18. The invention of claim 17 wherein the means for draining the oil comprises a vertically movable drain opening disposed within the reservoir, an oil drain communicating with the drain opening for draining excess oil above the second predetermined level; and, means to selectively adjust the vertical position of the drain opening.

19. The invention of claim 17 wherein the means for draining the oil includes an upstanding drain member positioned for vertical movement within the reservoir, the drain member having a drain opening at one end communicating with the oil in the reservoir, and an opening at its lower end communicating with the means delivering oil into the reservoir whereby oil under pressure enters the reservoir through the drain opening, and the excess oil drains back through the drain opening upon termination of reservoir filling; means draining the back-draining oil from the oil delivery means; and, means to selectively adjust the vertical position of the drain member for varying the second predetermined level.

20. The invention of claim 17 and further including a valve member communicating with the bottom of the reservoir and adapted in its open position to drain oil from the reservoir during shutdown of the popping machine to prevent oil solidification in the reservoir, and adapted in its closed position to retain the oil charge within the reservoir; and, means holding the valve in its open position responsive to continued popping cycles of the machine.

21. The invention of claim 17 and further including control means sensing oil level within the reservoir to terminate supply of the oil under pressure responsive to reservoir oil exceeding the second predetermined level whereby the excess oil above the draining level remaining after termination of oil delivery drains down to said draining level whereby the remaining oil in the reservoir is the preselected charge of oil.

22. The invention of claim 21 wherein the control means further includes means sensing oil level in the reservoir above the first predetermined level for initiating a popping function of the machine.

23. The invention of claim 17 wherein the oil reservoir includes a second discharge opening positioned in the upper margin of the reservoir and adapted to direct overflow oil from the reservoir where the control means terminating the filling means operation malfunctions or otherwise operates to continue to fill the reservoir above the first predetermined level, said control means adapted to terminate the filling means operation after a predetermined time sufficient to fill the reservoir above the first level.

24. Apparatus for popping corn in an automatic popcorn popping machine including the combination of: a popping pot adapted to be substantially closed throughout a cooking cycle; a popcorn evacuation conduit having a generally downwardly disposed inlet opening with the pot, extending through a side wall of the pot, and terminating in a discharge opening; an air current source; valve means operable to open and close communication between the source of air and the pot; and, control means operating the valve means to open said communication following termination of the cooking cycle whereby a stream of air entering from the source of air sweeps the popped corn into the conduit inlet and carries the corn through the conduit outside of the pot for discharge through said opening.

25. The invention of claim 24 wherein the pot includes a bottom popping plate, and an agitator mounted on the popping plate and adapted to agitate corn and oil thereon during a cooking cycle of the machine said agitator having a central hub portion defining an outwardly inclined plane for directing the corn and unpopped kernels into the evacuation conduit; the evacuative conduit having its inlet opening spaced above the agitator for allowing popped corn to move therebetween for entry into the conduit, the conduit inclining upwardly from said inlet to said pot side wall and having a discharge opening directed downwardly for discharging popcorn into a display area.

26. The invention of claim 24 wherein the air current source includes an air blower having an outlet connected with the valve means and an inlet; and, further including a cone member surrounding said conduit discharge, said cone having a lower discharge opening for directing popcorn received from the conduit into a display area, and an upper opening connected with the blower inlet for recirculating the air stream from the conduit to the blower.

27. Apparatus for popping corn in the pot of an automatic popcorn popping machine comprising the combination of: a steam and waste oil effluent condenser including an inlet and an outlet, a gas path connected between the inlet and outlet for condensing said steam and waster oil effluent, means for draining the steam and oil condensate from the path, and, means for directing a cooling medium in heat exchange relationship with the gas path for cooling said steam and waste oil effluent; valve means connecting the condenser inlet with the interior of the pot and adapted to open and close communication therebetween; control means operating the valve means to open said communication to the condenser for discharging the steam and effluent during a cooking cycle, and to close said communication throughout filling and evacuation cycles; and, means conveying the steam and effluent from the pot into the condenser during the cooking cycle.

28. The invention of claim 27 wherein the condenser gas path comprises heat exchange tube means defining a closed path between said condenser inlet and outlet; a cooling chamber enclosing said tubes, the chamber having an inlet and an outlet, said chamber outlet defining a narrowed throat section adjacent the discharge of the tube means, and, means forcing said cooling medium into the chamber inlet and in heat exchange relationship along the tubes to the chamber throat section creating a vacuum at the said tube means discharge; said means forcing the steam and effluent from the pot comprising atmospheric pressure within the pot moving the steam and effluent towards said vacuum in the throat section.

29. The invention of claim 27 and further characterized in that the valve means includes a discharge outlet provided in the upper section of the pot for removing steam and waste oil effluent therethrough; and, said inlet to the condenser comprises a steam condensing conduit, said conduit including a condensing surface above said pot outlet, a closed downwardly directed conduit portion leading from the condensing surface to the condenser inlet, and, a condensate trap below the condensing surface for directing condensate into the conduit portion for drainage into the condenser and preventing drainage back into the pot.

30. The invention of claim 29 wherein the condenser surface includes a dome-shaped member positioned above the pot outlet, and including a screen positioned between said outlet and dome for preventing escape of corn kernels and popped corn from the pot during a cooking cycle and to condense vapors thereon, and said trap includes a gutter member at the base of the screen for collecting the condensate forming on the dome and screen.

31. Apparatus for popping corn in an automatic popcorn machine, including the combination of: a popping pot; means for introducing an evacuation air stream into the pot; an outlet conduit including an inlet within the pot for receiving the air stream and popped corn during an evacuation cycle, and an outlet communicating outside of the pot; and, a trap apparatus for separating unpopped kernels from the popped corn, the trap apparatus including an upwardly directed channel having an inlet at its lower end communicating with the pot outlet, and an outlet at its upper end, the wall of said channel defining an upwardly angled surface deflecting the popped corn upwardly whereby the unpopped kernels move downwardly to the lower end of said plate by gravity, means for collecting the downwardly moving kernels for removal thereof, and, means for receiving the popped corn from the upper end of the channel and directing the same downwardly into a display area.

32. The invention of claim 31 and further characterized in that an upstanding tube is provided adjacent the pot outlet enclosing said channel, and including a dome portion closing te upper end of the tube for directing the popped corn downwardly from the channel outlet, said channel defining a longitudinal section of a cone vertically axised, said cone section being disposed with its large radius as the outlet and its small radius as the inlet.

33. Apparatus for popping corn in a popcorn popping machine having a pot closed at its lower end by a substantially flat hot plate, including the combination of: an agitator mounted for rotation within the pot on the surface of the hot plate, said agitator including a plurality of radially extending blades in sliding contact with said surface, each of said blades having a forward edge inclined outwardly in a given direction with respect to a radius from the agitator axis of rotation; evacuator conduit means having an inlet spaced above the agitator and centered substantially on the agitator axis of rotation, the conduit means adapted to direct a stream of air and popped corn to a discharge outlet outside of the pot; and means to rotate the agitator in said given direction whereby popped corn is swept radially inwardly for removal through said inlet.

34. The invention of claim 33 wherein the agitator further includes a central hub portion flaring radially outwardly and downwardly toward the hot plate, whereby the air stream entrains the popped corn and unpopped kernels for movement along the hub portion into the conduit means inlet.

35. Apparatus for popping corn in the pot of an automatic popcorn popping machine adapted for cycling through start, supplies fill, cook, and product evacuation cycles, including the combination of: a popping pot, a fill opening above the pot for injecting corn and salt charges thereinto during the fill cycle; an effluent outlet opening above the pot for removing steam and waste oil effluent during the cook cycle; an evacuation air inlet opening above the pot for receiving a stream of air during the evacuation cycle; a valve disc mounted for rotation with respect to the pot and to open and close communication between the openings and pot interior, said disc having a valving hole adapted to serially rotate into registry with said fill opening, effluent outlet, and evacuation inlet; and, means to rotate said valve disc for opening communication between the pot and respective openings in accordance with a predetermined program.

36. The invention of claim 35 and further including control means adapted to correlate functions of the popping machine control circuit with valve disc rotation, said control means including first switch means for conditioning the control circuit to start machine operation, second switch means for operating said control circuit through the fill cycle, third switch means for operating the control circuit through the cook cycle, and fourth switch means for operating the control circuit through the evacuation cycle, each of said switch means having a predetermined angular relationship with respect to the fill opening, effluent outlet, and evacuation inlet; and, switch operating means mounted for rotation with the valve disc and adapted to operate respective switch means responsive to the rotation of the disc hole to respective start, fill, cook, and evacuation positions.

37. The invention of claim 36 wherein the first switch means is positioned on a radial line bisecting the included angle between the fill opening and evacuation inlet, said second switch means positioned on a radial line through the fill opening, said third switch means positioned on a radial line through the effluent outlet, and said fourth switch means positioned on a radial line through the evacuation inlet; and, said switch operating means comprises a switch operating cam mounted for rotation with the valve disc and aligned on a radial line substantially centered on the disc hole.

* * * * *